United States Patent
Iizuka et al.

[11] Patent Number: 5,900,964
[45] Date of Patent: *May 4, 1999

[54] LASER SCANNING DEVICE

[75] Inventors: Takashi Iizuka; Ryota Ogawa, both of Tokyo, Japan

[73] Assignee: Asahi Kogaku Kogyo Kabushiki Kaisha, Tokyo, Japan

[*] Notice: This patent is subject to a terminal disclaimer.

[21] Appl. No.: 08/744,666

[22] Filed: Nov. 6, 1996

Related U.S. Application Data

[60] Continuation of application No. 08/429,875, Apr. 27, 1995, Pat. No. 5,604,622, which is a division of application No. 08/180,997, Jan. 14, 1994, Pat. No. 5,572,353.

[30] Foreign Application Priority Data

Jan. 14, 1993 [JP] Japan ............................. 5-4957
Nov. 5, 1993 [JP] Japan ........................... 5-276974

[51] Int. Cl.$^6$ .................................................. G02B 26/08
[52] U.S. Cl. ......................... 359/207; 359/205; 359/208; 359/216; 359/217
[58] Field of Search ................. 359/205–208, 359/216–219; 347/258–261

[56] References Cited

U.S. PATENT DOCUMENTS

| | | |
|---|---|---|
| 3,520,586 | 7/1970 | Bousky . |
| 3,870,394 | 3/1975 | Ploeckl . |
| 4,054,361 | 10/1977 | Noguchi . |
| 4,908,708 | 3/1990 | Kuroda . |
| 4,930,850 | 6/1990 | Morimoto . |
| 4,984,858 | 1/1991 | Kuroda . |
| 5,004,929 | 4/1991 | Kabinoki et al. . |
| 5,038,156 | 8/1991 | Kuroda . |
| 5,055,663 | 10/1991 | Morimoto et al. . |
| 5,066,987 | 11/1991 | Minefuji et al. . |
| 5,067,782 | 11/1991 | Morimoto . |
| 5,093,745 | 3/1992 | Kuroda . |
| 5,107,364 | 4/1992 | Morimoto et al. . |
| 5,130,840 | 7/1992 | Iima et al. . |
| 5,134,513 | 7/1992 | Morimoto . |
| 5,162,938 | 11/1992 | Iima et al. . |
| 5,189,546 | 2/1993 | Iizuka et al. . |
| 5,194,981 | 3/1993 | Morimoto . |
| 5,194,982 | 3/1993 | Morimoto . |
| 5,220,449 | 6/1993 | Kuroda . |
| 5,233,457 | 8/1993 | Hamada et al. . |
| 5,255,113 | 10/1993 | Yoshikawa et al. . |
| 5,327,280 | 7/1994 | Morimoto . |
| 5,408,095 | 4/1995 | Atsuumi et al. . |
| 5,426,298 | 6/1995 | Sakuma et al. ......................... 359/205 |
| 5,572,353 | 11/1996 | Iizuka et al. .......................... 359/207 |

FOREIGN PATENT DOCUMENTS

| | | |
|---|---|---|
| 6480923 | 9/1987 | Japan . |
| 1234815 | 9/1989 | Japan . |

Primary Examiner—James Phan
Attorney, Agent, or Firm—Greenblum & Bernstein, P.L.C.

[57] ABSTRACT

A scanning optical system for scanning an object surface includes a light emitting device for emitting a beam of light and a deflection mirror rotatable to deflect the beam emitted by the light emitting device, and to scan within a predetermined scanning angle zone along a main scanning plane. The beam incident to the deflection mirror is inclined in a direction of an auxiliary scanning, a direction of incidence of the beam onto the deflection mirror intersects a rotational axis of said deflection mirror, and the direction of the beam is orthogonal to a reflection surface of the deflection mirror, when viewed in the main scanning plane as the beam reaches the center of the predetermined scanning angle zone. A curved mirror having power at least in the main scanning plane, and a toric lens positioned between the curved mirror and the object surface and having power at least in the auxiliary scanning direction are also provided.

14 Claims, 23 Drawing Sheets

K = 125

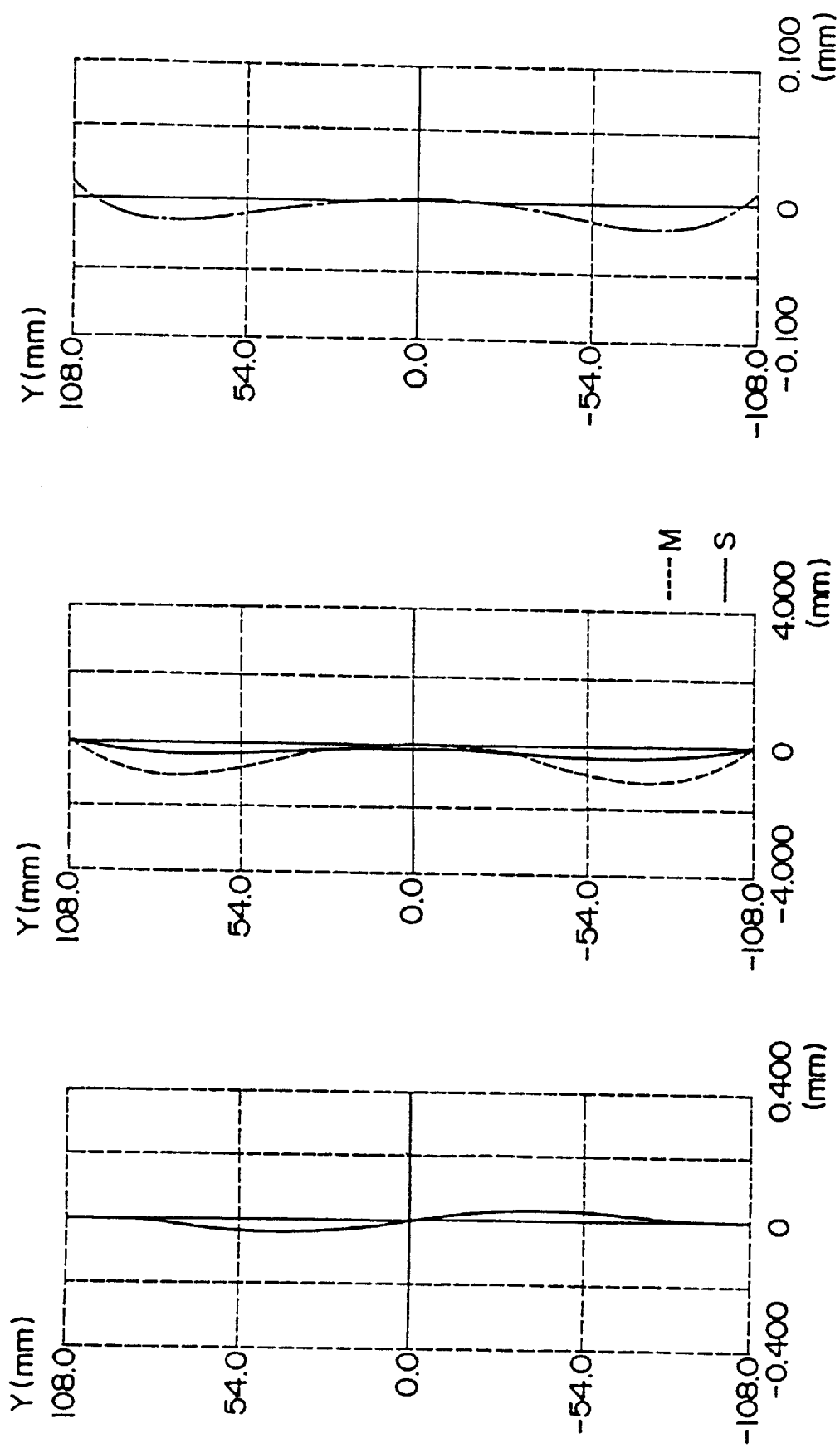

LASER SCANNING DEVICE

This application is a continuation of application Ser. No. 08/429,875, filed Apr. 27, 1995, U.S. Pat. No. 5,604,622, which is a division of application Ser. No. 08/180,997, filed Jan. 14, 1994, which issued as U.S. Pat. No. 5,572,353.

BACKGROUND OF THE INVENTION

The present invention relates to a laser scanning optical system including a reading optical system for reading information on an object surface and/or an image forming optical system for forming images on a photoconductive surface.

A conventional laser scanning optical system is provided with a light source such as a semiconductor laser, a light deflecting device such as a polygonal mirror, and a scanning lens system such as an fθ lens. A laser beam is emitted by a semiconductor laser, and is deflected by the polygonal mirror. Then the laser beam passes through the fθ lens to scan a predetermined area on an object surface (i.e., the main scanning is executed). While the main scanning is being executed, the object surface is moved in a direction orthogonal to the direction of the main scanning (i.e., the auxiliary scanning is executed). Thus, the object surface is two-dimensionally scanned.

The scanning optical system generally includes a plurality of lenses respectively having complex surfaces such as toric surfaces. Surface accuracies of such lenses are relatively difficult to achieve during manufacture. Thus, when they are used in the image reading optical system, chromatic aberration occurs.

Recently, in order to avoid occurrence of chromatic aberration, a reflection type optical system employing mirror (s) instead of lenses has been proposed. In an example of such an optical system, a beam emitted by a light source is deflected by a polygonal mirror. The deflected beam is directed towards a cylindrical mirror which functions as an fθ lens. Note that in this type of conventional arrangement, the beam emitted by the light source, the beam deflected by the polygonal mirror, and the beam reflected by the cylindrical mirror are on the same plane. Accordingly, a half mirror is inserted between the polygonal mirror and the cylindrical mirror, and the beam reflected by the cylindrical mirror is reflected by the half mirror and directed to a photosensitive surface to be scanned. Another example of such a system has substantially the same construction, but the cylindrical mirror is tilted so that the beam reflected by the cylindrical mirror passes out of the plane which includes the beam emitted by the light source and the beam deflected by the polygonal mirror.

When the optical scanning system employs the polygonal mirror as a deflection device, a deflection point at which an incident beam is deflected varies in the direction of the optical axis of the beam as the polygonal mirror rotates. Consequently, the incident beam of light is not a parallel beam, and a curvature of the image surface occurs. Further, if the cylindrical mirror is tilted as described above, the reflected beam forms a scanning line which is curved in the direction of the auxiliary scanning. In other words, a "bow" (i.e., a bend of a scanning line in the direction of the auxiliary scanning) occurs due to the tilted arrangement of the cylindrical mirror.

The curvature of the image surface is canceled by the shape of the surface of the cylindrical mirror and the shape of a cylindrical lens through which the reflected beam passes. With respect to the "bow", since the reflected beam passes through the cylindrical lens, which functions as a reducing optical system, the effect of the "bow" is suppressed.

In the former example, however, the beam deflected by the polygonal mirror and the beam reflected by the polygonal mirror are in the same plane (i.e., in a main scanning plane). In such a construction, since the light source should be positioned out of the area where the scanning is effective, the scannable angle (the angle within which the beam is capable of scanning) is limited to a relatively small angle. Further, since the curvature of the image surface is formed non-symmetrically with respect to the optical axis of the optical system, it is difficult to compensate for distortion or the like.

In the system described above, the "bow" is reduced, but is not canceled. Thus the scanning line remains bent although the bending amount is small, and the system cannot be applied to those situations requiring accurate imaging (i.e., high resolution imaging).

SUMMARY OF THE INVENTION

It is therefore an object of the present invention to provide an improved scanning optical system which is capable of scanning a wide area by employing a tilted curved mirror such as a cylindrical mirror, and which is further capable of canceling the occurrence of "bow".

For the above object, according to the present invention, there is provided a scanning optical system for executing a main scanning and an auxiliary scanning in order to scan an object surface two-dimensionally.

The system includes a light emitting device for emitting a beam of light and a deflection mirror having a plurality of light reflection surfaces mounted for rotation to deflect the beam emitted by the light emitting device to deflect the beam reflected by the plurality of light reflection surfaces and scanning within a predetermined scanning angle zone along a direction of the main scanning.

The beam incident to the deflection mirror is inclined in the direction of the auxiliary scanning, the optical axis of the beam incident to the deflection mirror crosses the rotational axis of the deflection mirror, the optical axis of the beam, when the beam reaches the center of the predetermined scanning angle zone, is orthogonal to one of the plurality of light reflection surfaces when seen from the auxiliary scanning direction.

A curved mirror having a predetermined curvature is positioned so that the beam reflected by the plurality of reflection surfaces is incident to the curved mirror and reflected towards the object surface at a predetermined angle in the auxiliary scanning direction.

An anamorphic lens is positioned between the curved mirror and the objective surface for converging the beam reflected by the curved mirror onto the object surface, wherein the anamorphic lens has power mainly in the auxiliary scanning direction.

According to another aspect of the invention, there is provided a scanning optical system for performing a main scanning and an auxiliary scanning to obtain a two dimensional image information from an object surface.

An anamorphic lens having power mainly in a direction of the auxiliary scanning is also provided and a beam of light from an object surface passes through the anamorphic lens.

A curved mirror having a predetermined curvature in the direction of main scanning is also provided and the beam past through said anamorphic lens is incident to the curved mirror at a predetermined angle in the direction of auxiliary scanning.

A deflection mirror which rotates to deflect a beam reflected by the curved mirror which is incident to the deflection mirror at another predetermined angle in the direction of auxiliary scanning is provided.

Finally a light receiving device having an optical axis crossing the rotational axis of the deflection mirror is provided and the beams of the object surface along the direction of main scanning is subsequently incident to the light receiving device as the deflection mirror rotates.

DESCRIPTION OF THE ACCOMPANYING DRAWINGS

FIG. 15A shows an fθ characteristic according to the third embodiment;

FIG. 15B shows a curvature of the image surface according to the third embodiment;

FIG. 15C shows a "bow" characteristic according to the third embodiment;

DESCRIPTION OF THE EMBODIMENTS

Figure 1:
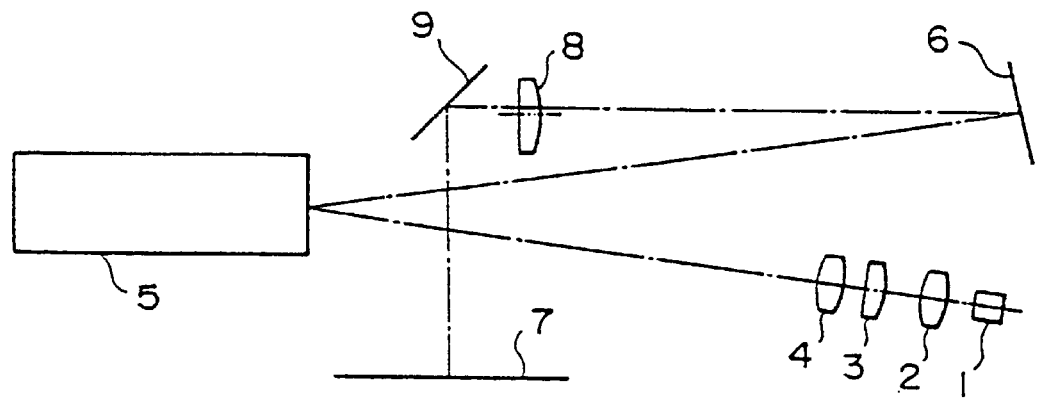
FIG. 1 shows an arrangement of a scanning optical system along an auxiliary scanning plane.
Figure 2:
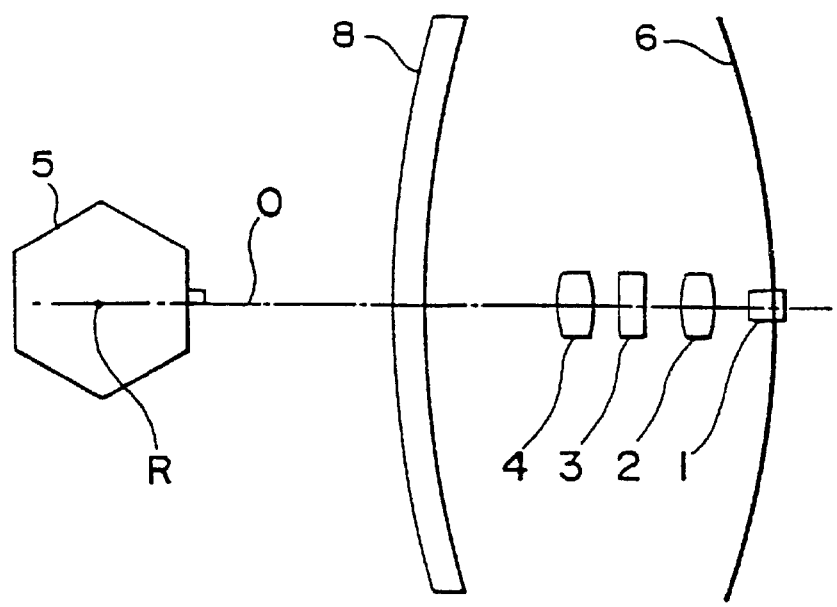
FIG. 2 shows an arrangement of the scanning optical system along a main scanning plane.

FIGS. 1 and 2 show an arrangement of a scanning optical system embodying the present invention. Generally, a scanning optical system emits a beam of light which scans an object surface along a predetermined scanning direction. While scanning along the predetermined scanning direction, the object is moved, relative to the position where the laser beam scans, in the direction orthogonal to the predetermined scanning direction. Thus, the object surface is two-dimensionally scanned. In the following description, the predetermined scanning direction is referred to as a main scanning direction, and the direction of the relative movement of the object surface is referred to as an auxiliary scanning direction. Further, a plane including the scanning beam of light is referred to as a main scanning plane, and a plane including a direction orthogonal to the main scanning plane is referred to as an auxiliary scanning plane.

FIG. 1 shows an arrangement of the scanning optical system along the auxiliary scanning plane, and FIG. 2 shows the arrangement on the main scanning plane.

The scanning optical system includes a semiconductor laser 1, a collimator lens 2, a cylindrical lens 3 having magnifying power only in the direction of the auxiliary scanning, a condenser lens 4 having a power both in the main and in the auxiliary scanning directions, a polygonal mirror 5 that is rotated and which deflects laser beam, and a cylindrical mirror 6 that reflects the laser beam deflected by the polygonal mirror towards an object surface 7 to be scanned. Between the cylindrical mirror 6 and the object surface 7, a toric lens 8 functioning as an anamorphic lens is provided. As described above, a plane including the beam deflected by the polygonal mirror 5 is hereinafter referred to as the main scanning plane.

The cylindrical mirror 6 has a spherical surface along the main scanning direction, and a flat surface along the auxiliary scanning direction. The toric lens 8 is curved oppositely to the cylindrical mirror 6 as shown in FIG. 2 along the direction of the main scanning. The optical axis of the toric lens 8 is displaced with respect to the optical axis of the laser beam (i.e., the optical axis of the scanning optical system) in the direction of the auxiliary scanning as shown in FIG. 1. The toric lens 8 has a power only in the auxiliary scanning direction. The power of the toric lens 8 is stronger in the center portion along the main scanning direction than in the peripheral portions.

The laser beam emitted by the semiconductor laser 1 is converged in both the main scanning direction and in the auxiliary scanning direction, and directed to the polygonal mirror 5 from the direction out of the main scanning plane. The semiconductor laser 1, the collimator lens 2, the cylindrical lens 3, and the condenser lens 4 are arranged in such a fashion that the beam incident to the reflection surface of the polygonal mirror 5 is inclined in the direction of the auxiliary scanning, the optical axis of the incident laser beam crosses the rotational axis of the polygonal mirror 5, and the optical axis of the laser beam, when the scanning laser beam reaches the center of the scanning angle zone, is orthogonal to the light reflection plane of the polygonal mirror 5 when seen from the auxiliary scanning direction.

The beam reaching the polygonal mirror 5 is converged more in the auxiliary scanning direction by the cylindrical lens 3, and the converged laser beam forms a line-spread image adjacent to the reflecting surface of the polygonal mirror 5.

The laser beam reflected (deflected) by the polygonal mirror 5 is incident to the cylindrical mirror 6 at a predetermined angle in the auxiliary scanning direction. The laser beam reflected by the cylindrical mirror 6 passes through the toric lens 8 and is directed to the object surface 7 by way of a mirror 9.

The laser beam is collected (converged) in the main scanning direction mainly by the condenser lens 4 and transmitted towards the object surface 7. In the auxiliary scanning direction, the laser beam is converged by the cylindrical lens 3, the condenser lens 4, and the toric lens 8.

Since the laser beam is incident to the polygonal mirror 5 as described above, the scannable area, in which the laser beam is capable of scanning, can be made relatively wide. In terms of the size of the polygonal mirror, the scannable area with respect to the size of the polygonal mirror 5 is wider than in the conventional systems. In terms of the scannable area, the size of the polygonal mirror can be made small. Further, since the curvature of the image plane occurs symmetrically with respect to the center of the scanning area, the compensation therefor becomes facilitated.

Since the laser beam is incident to the polygonal mirror 5 with a predetermined angle in the auxiliary scanning direction, a skew of wavefront occurs as the polygonal mirror 5 rotates. That is, as the polygonal mirror 5 rotates, the direction where the line-spread image extends changes. If the direction of the line-spread image differs from the direction of the power of the toric lens 8, a skew of the wavefront occurs. The skew of the wavefront worsens the wavefront aberration of the laser beam, which deteriorates the convergence of the laser spot on the object surface 7. If the scanning area is relatively small, the skew of the wavefront can be ignored. However, since the skew of the wavefront is not negligible at the side (peripheral) areas when the scanning area is wide, it becomes necessary to cancel or compensate this wavefront aberration (i.e., the skew of the wavefront). In the present embodiment, by locating the toric lens 8 such that the optical axis of the toric lens 8 is displaced in the auxiliary scanning direction, with respect to the optical axis of the laser beam passing therethrough, the skew of the wavefront is canceled.

Figure 3:
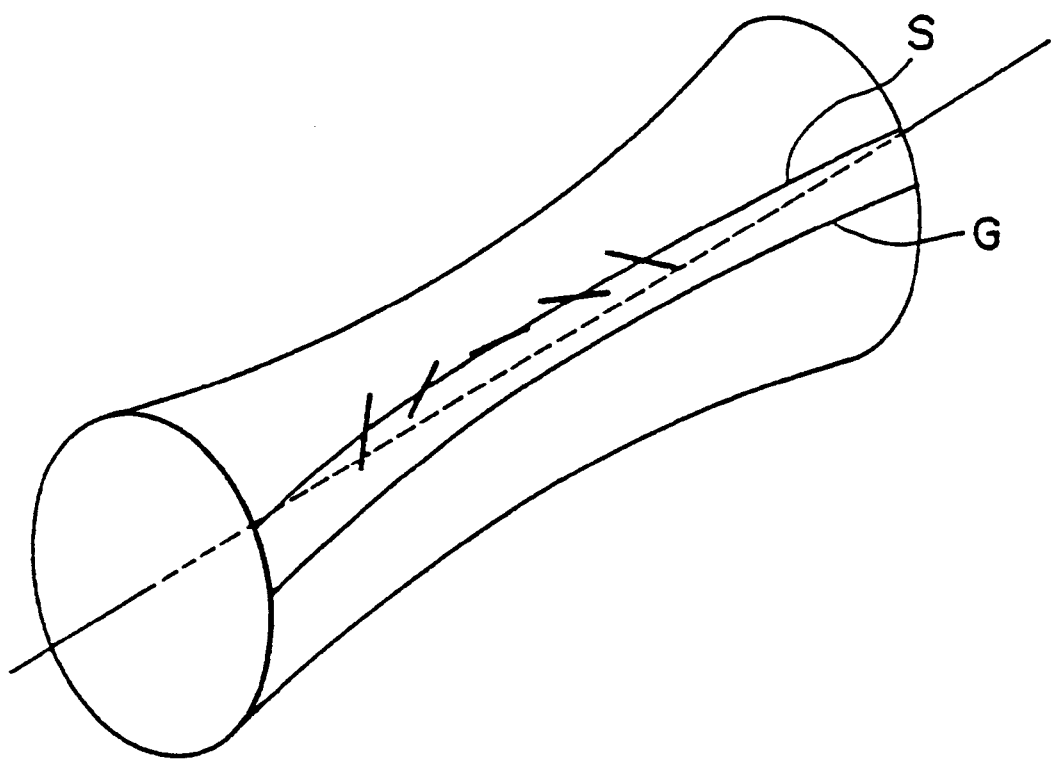
FIG. 3 shows a perspective view of a modeled toric lens.

FIG. 3 shows a modeled toric lens 8. As described above, the optical axis of the toric lens 8 is displaced with respect to the path of the laser beam. Accordingly, the locus "S" of the scanning beam on the surface of the toric lens 8 differs from the generatrix G of the toric lens 8. On the surface of the toric lens 8, the cross section of the laser beam is a predetermined oval shape. In FIG. 3, however, in order to stress the direction that the skew of the wavefront affects, the beam is represented by thick lines, the directions of which correspond to the directions of the line-spread image lying near the polygonal mirror 5. As described above, since the laser beam scans on the toric lens 8 at a position different from the generatrix G of the lens 8, the skew of the wavefront is compensated by the prismatic function thereof.

In this type of optical system, two bows (i.e., bends of the scanned line in the auxiliary scanning direction) occur, as will be described below. One scan line bend occurs because the beam incident to the polygonal mirror 5 is inclined with respect to the rotational axis of the polygonal mirror while the other scan line bend occurs because the beam incident to the cylindrical mirror 6 is inclined.

Figure 4A:
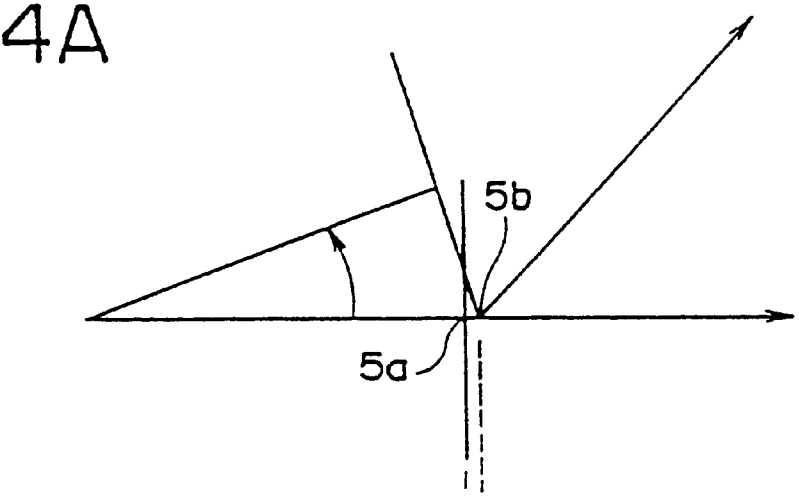
FIGS. 4A through 4C are diagrams illustrating the occurrence of a "bow" by a polygonal mirror.
Figure 4B:
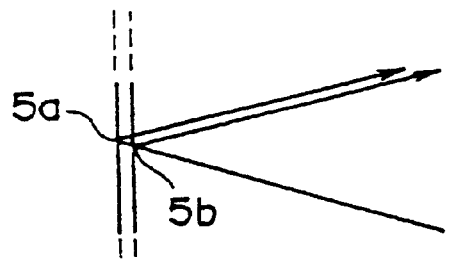
Figure 4C:
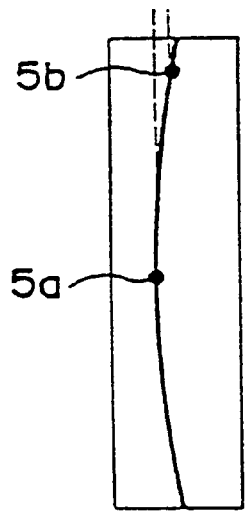

The first "bow" (or scan line bend) described above occurs as follows. FIGS. 4A, 4B and 4C show the changes of the deflecting point due to the rotation of the polygonal mirror 5. FIG. 4A shows the deflecting points on the main scanning plane, and FIG. 4B shows the deflecting points on the auxiliary scanning plane. When a beam and the reflecting surface of the polygonal mirror 5 form a right angle, the beam is reflected at point 5a. If the polygonal mirror 5 rotates by a predetermined amount, the deflection point shifts to point 5b.

Since the axis of the incident beam is inclined in the auxiliary scanning direction, if the deflection point is shifted as shown in FIG. 4A due to the rotation of the polygonal mirror 5, the deflection point is also shifted in the auxiliary scanning direction as shown in FIG. 4B. Therefore, on the light reflecting surface of the polygonal mirror 5, the locus of the deflection point is bent as shown in FIG. 4C.

Even if the shift of the deflection point on the polygonal mirror 5 is ignored, since the incident beam is inclined in the direction of the auxiliary scanning, the locus of the reflected beam forms a cone.

Since the displacement of the beam, which is caused by the shift of the deflection point and the change of the reflected direction, is amplified and/or reduced by the optical system, the bow unavoidably occurs on the object surface 7.

Figure 5A:
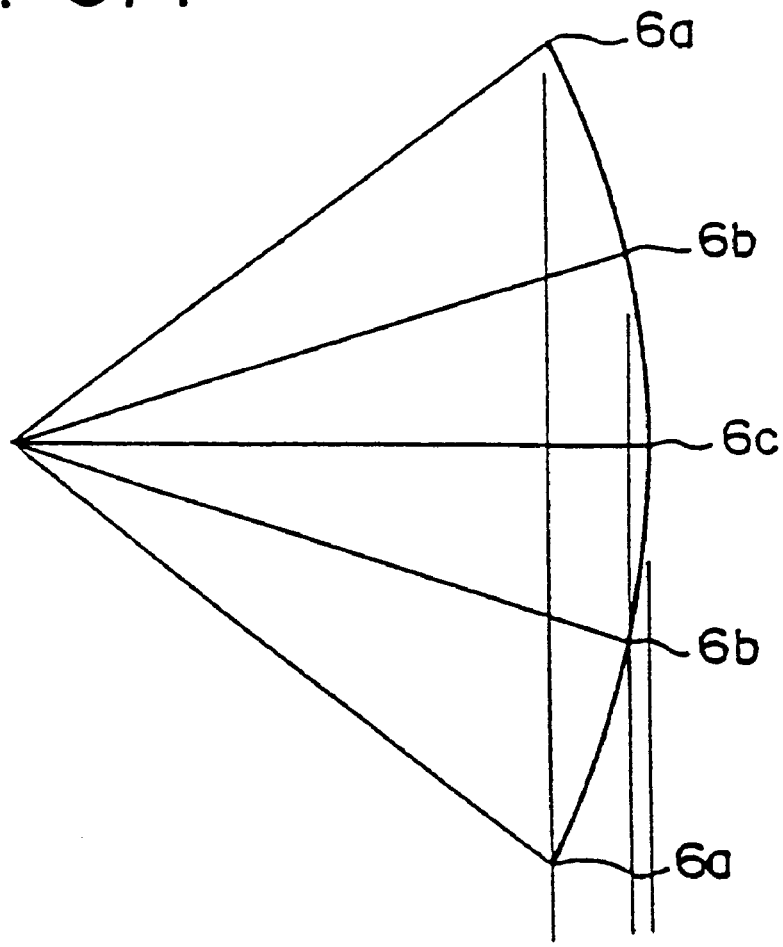
FIGS. 5A and 5B are diagrams illustrating the occurrence of a "bow" by a cylindrical mirror.
Figure 5B:
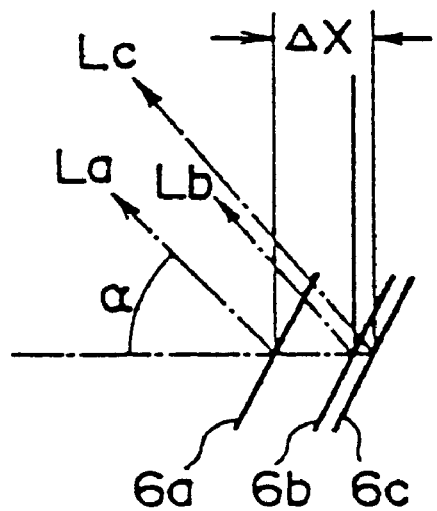
Figure 6:
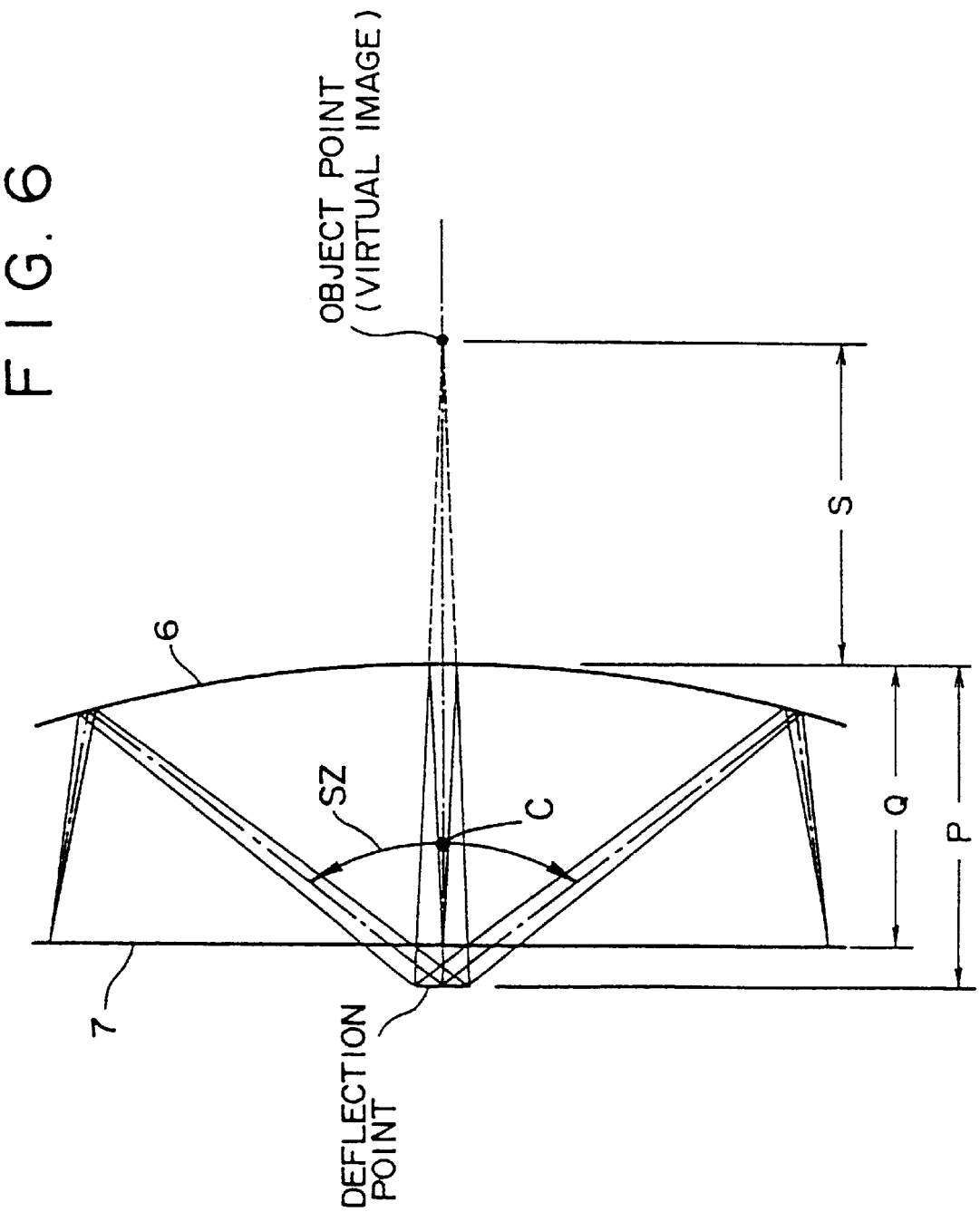
FIG. 6 is a diagram illustrating the fθ characteristics and the curvature of the image surface.
Figure 7:
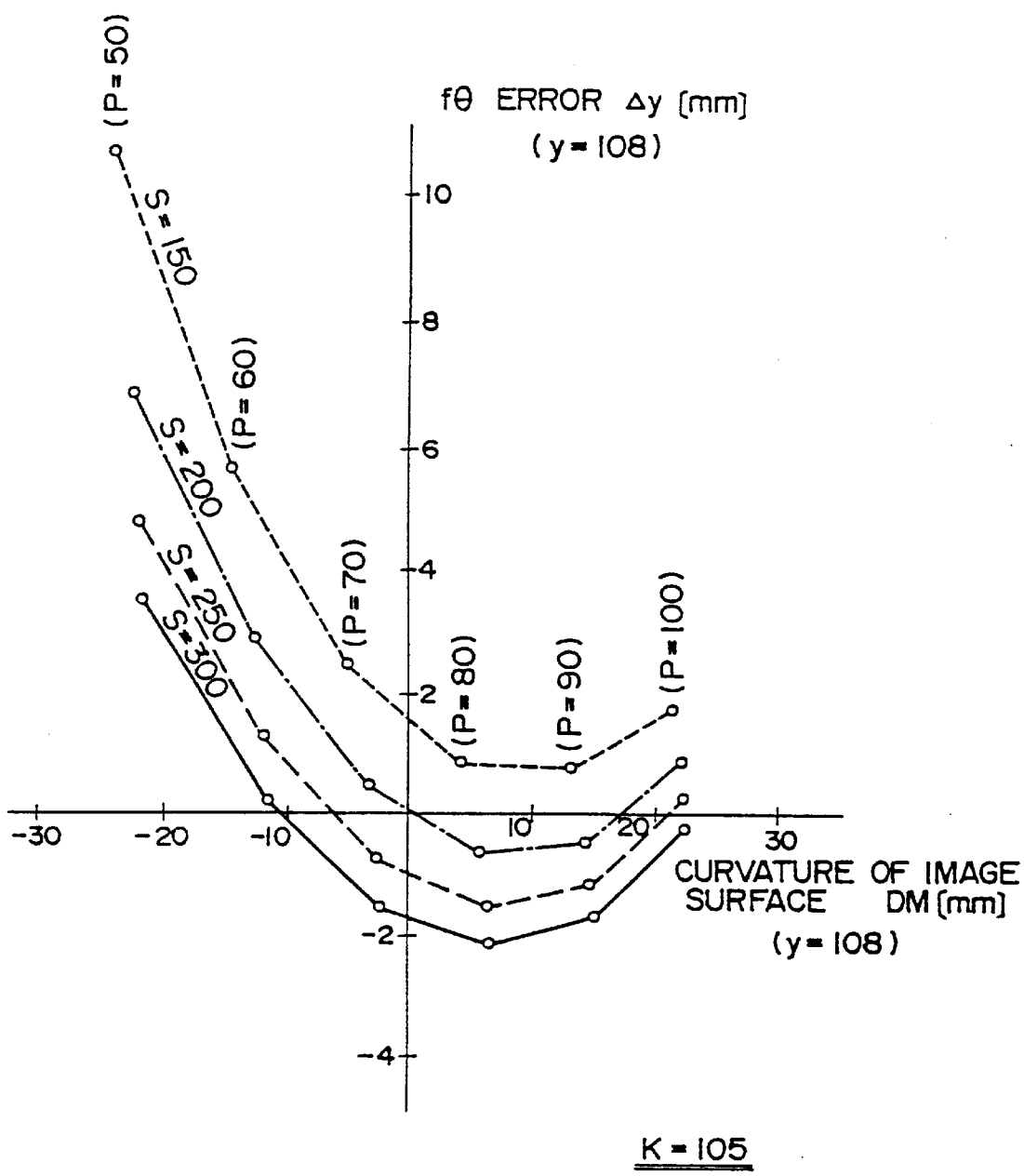
FIG. 7 is a graph showing a relation between the fθ characteristic and the curvature of the image surface with respect to the distances S and P, when the scanning coefficient K=105.
Figure 8:
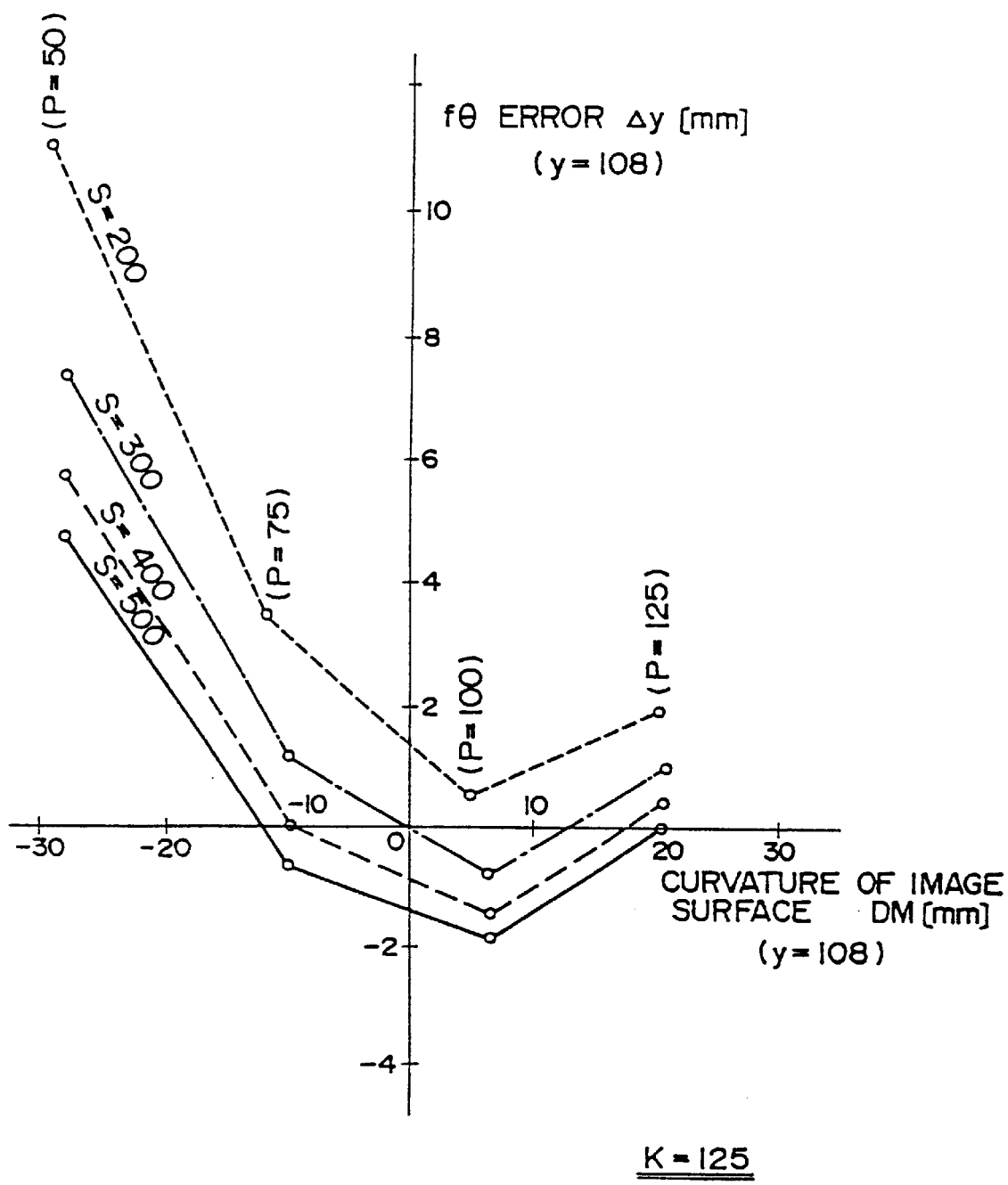
FIG. 8 is a graph showing a relation between the fθ characteristic and the curvature of the image surface with respect to the distances S and P, when the scanning coefficient K=125.
Figure 9:
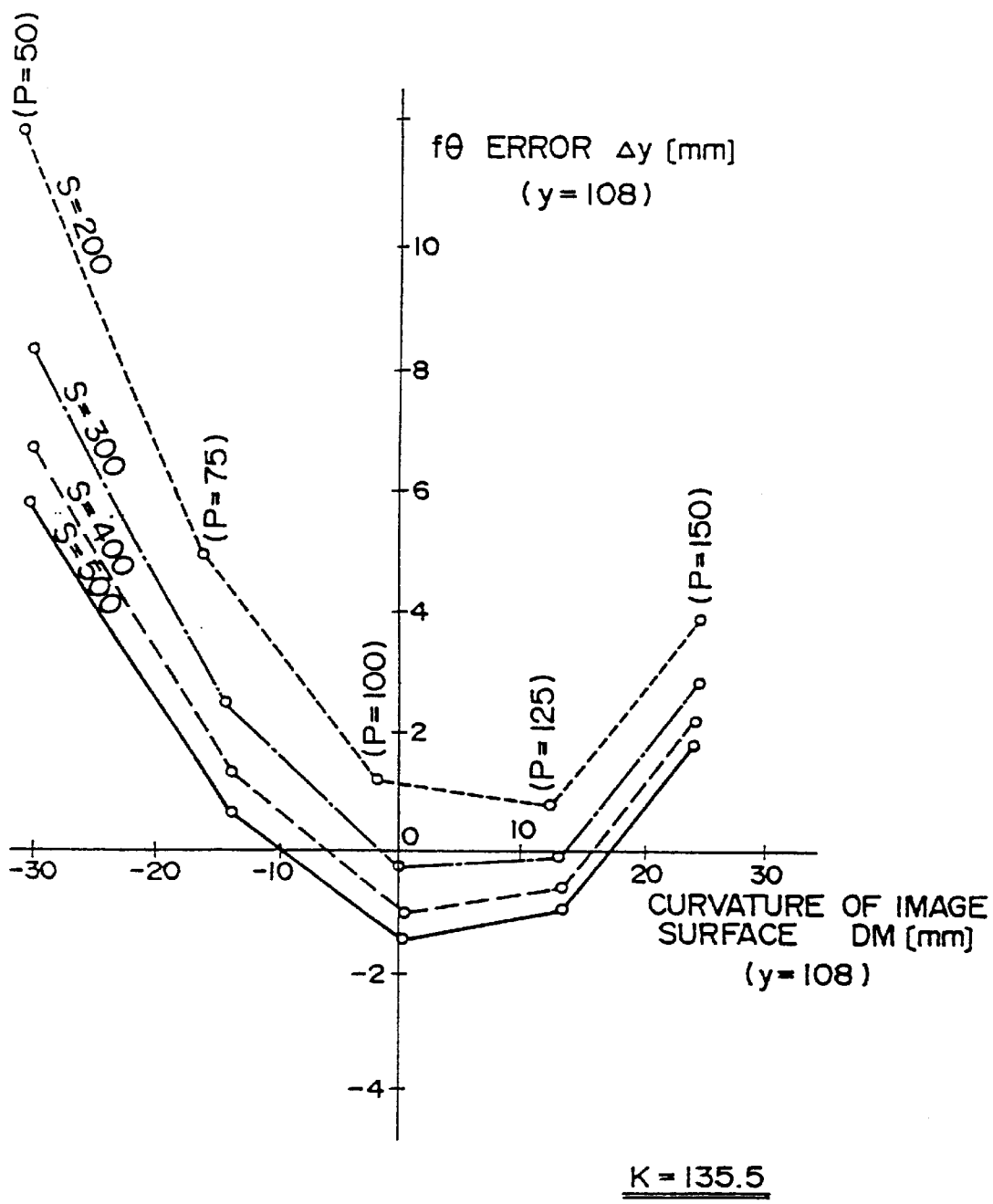
FIG. 9 is a graph showing a relation between the fθ characteristic and the curvature of the image surface with respect to the distances S and P, when the scanning coefficient K=135.5.
Figure 10:
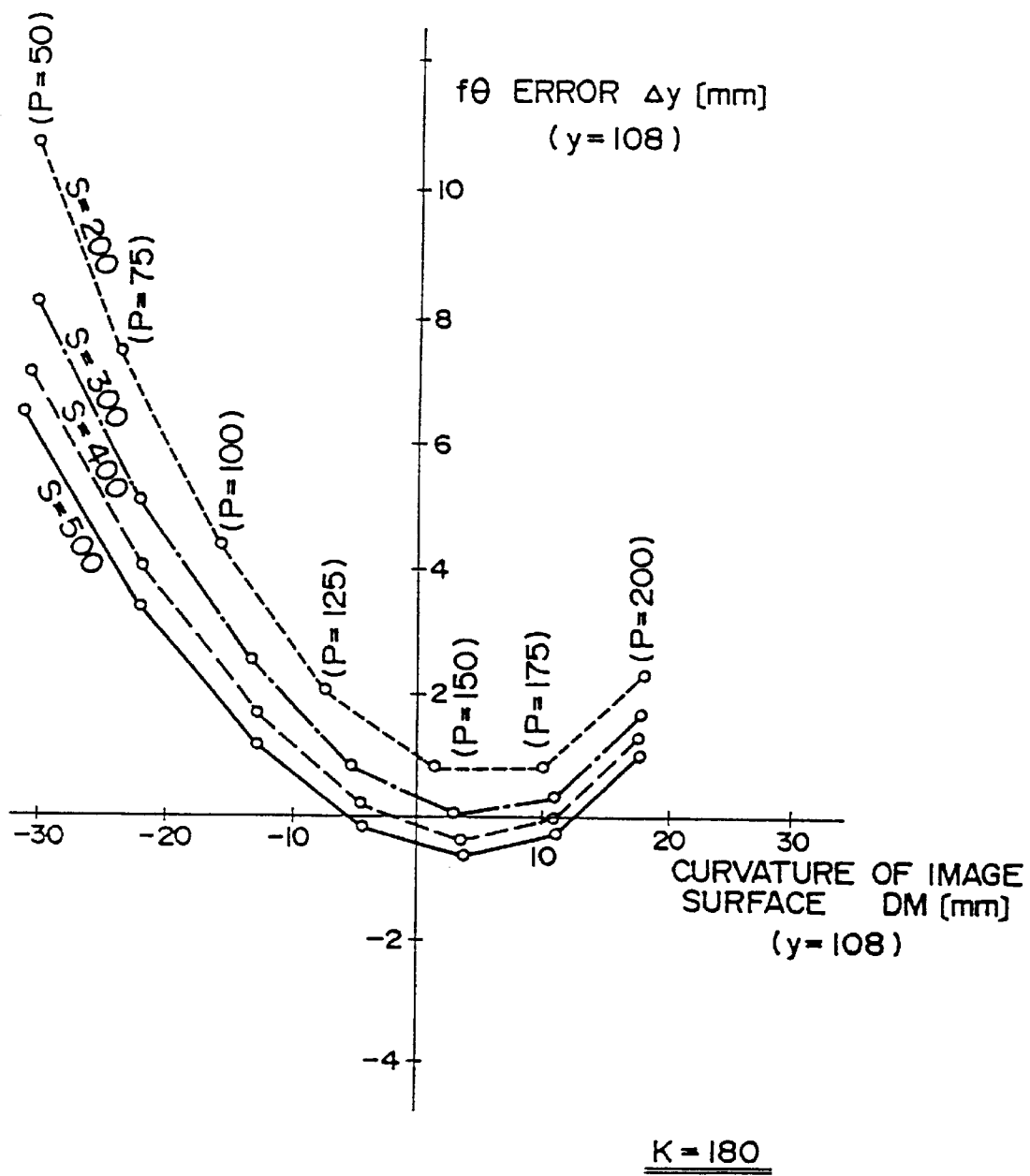
FIG. 10 is a graph showing a relation between the fθ characteristic and the curvature of the image surface with respect to the distances S and P, when the scanning coefficient K=180.

FIGS. 5A and 5B illustrate the occurrence of a bow due to the inclined incident beam with respect to the cylindrical mirror 6. FIG. 5A shows the reflection in the main scanning direction, and FIG. 5B shows the reflection in the auxiliary scanning direction. In a scanning area on the cylindrical mirror 6, the distance, in the direction of the optical axis of the mirror 6, between a reflecting point 6a at each side portion, a reflecting point 6c at a central portion, a reflecting point 6b at an each intermediate point is D at the greatest. The laser beam incident to the cylindrical mirror 6 is inclined in the auxiliary scanning direction, as shown in FIG. 5B. Accordingly, if the laser beam is always incident from the same direction, each of the reflected beams La, Lb and Lc reflected at the points 6a, 6b and 6c forms angle a with respect to the respective incident beam. However, the reflected beams La, Lb and Lc are shifted in parallel with each other as shown in FIG. 5B, and accordingly, the bow occurs on the object surface 7.

Either the laser beam incident to the polygonal mirror 5 or the laser beam incident to the cylindrical mirror 6 is inclined in the direction of the auxiliary scanning. In the present embodiment, the polygonal mirror 5 and the cylindrical mirror 6 are arranged so that the bows caused thereby are in opposite directions, and the occurrences of the bows on the object surface 7 are thereby substantially canceled by each other.

In the present embodiment, in order to cancel the bow caused by the cylindrical mirror 6, the laser beam incident to the polygonal mirror 5 is inclined (not perpendicular) with respect to the rotational axis of the polygonal mirror 5, so that the bow is formed in the opposite direction. In this case, the surface of the polygonal mirror 5 is formed in parallel with the rotational axis. Instead of this construction of the present embodiment, it is possible to use a tapered polygonal mirror having a surface inclined with respect to the rotational axis thereof.

In the embodiment, the optical axis of the toric lens 8 is displaced with respect to the optical axis of the laser beam.

Figure 28A:
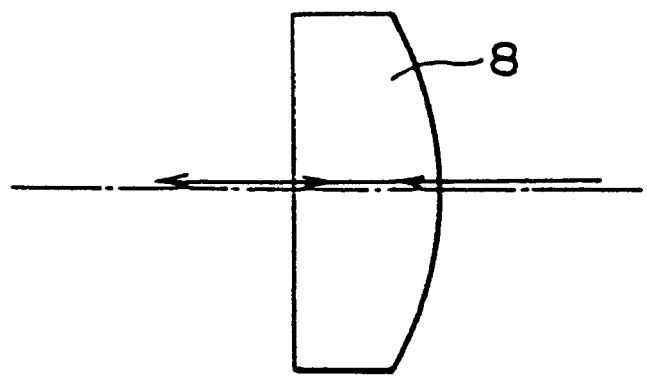
FIG. 28A shows an arrangement of the toric lens when the optical axis thereof coincides with the optical axis of the entire system.

As shown in FIG. 28A, if the optical axis of the toric lens 8 coincides with that of the entire optical system, the beam incident to the toric lens 8 may be reflected on the surface thereof. Since the reflected beam is also on the optical axis of the toric lens 8, the beam may be emitted from the toric lens 8 after being repeatedly reflected inside the toric lens 8. This may add noise to the original beam which directly passes through the toric lens 8.

Figure 28B:
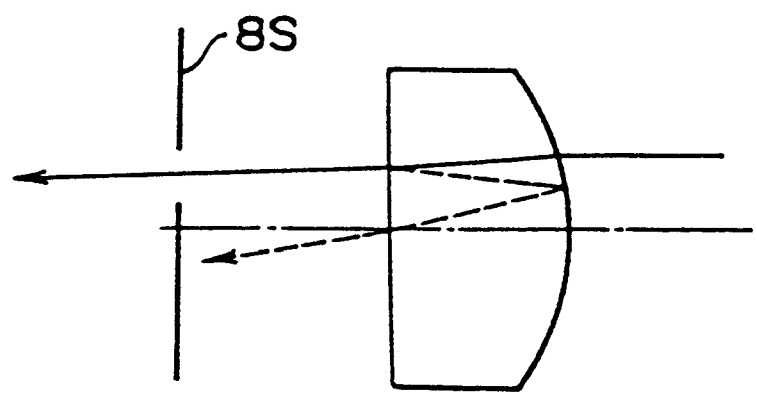
FIG. 28B shows an arrangement of the toric lens of the present invention and the light shield member.

If the optical axis of the toric lens 8 is shifted with respect to the optical axis of the entire system, the beam reflected on the surface of the toric lens 8 proceeds along a different path from the path of the beam directly passing through the toric lens 8. Accordingly, a shield member 8S is provided as shown in FIG. 28B, and the unnecessary beam can be prevented from being emitting on the subject surface 7.

Thus, the light reflected by the surface of the toric lens 8 proceeds along the path different from that of the beam directly passing through the toric lens 8. If a light shield member which only allows the beam directly passing through the toric lens 8 and shields the beam emitted after being reflected in the toric lens 8 is placed, the reflected beam is prevented from being incident to the object surface 7. Thus, ghosting or noise can be effectively avoided. This characteristic feature can be used not only in the image forming optical system, but also in a reading optical system. If this feature is used in the reading optical system, the reflected beam is prevented from being incident to a light receiving optical system.

Since the laser beam scans the object surface 7 by way of the cylindrical mirror 6, the curvature of the image field and an fθ error is determined based on a radius R of the curvature of the cylindrical mirror 6, a distance Q between the cylindrical mirror 6 and the object surface 7, and the scanning coefficient K. In a system using an fθ lens, the image height Y is defined as:

$$Y = f\theta,$$

wherein f is a focal length of the lens, and θ is an incident angle to the polygonal mirror.

In the present invention, a curved mirror is used instead of the fθ lens, and in order to define the relation of the image height Y and rotation angle θ of the polygonal mirror, the scanning coefficient K is used as a virtual focal length.

The radius of the curvature R, and the distances Q are obtained as follows.

$$f = (S+P)*Q/S \tag{1}$$

$$1/Q = (1/S) + (2/R) \tag{2}$$

Wherein, S is a distance along the optical axis between an object point and the cylindrical mirror 6, P is a distance between the cylindrical mirror 6 and the deflection point, and f is the focal length of the optical system in the main scanning plane.

From equation (1), $$Q = f*S/(S+P) \tag{3}$$

From equations (2) and (3), $$R = 2f*S/(S+P-f) \tag{4}$$

FIGS. 7 through 10 are graphs showing the relation between the fθ error Ay and the curvature of the image surface DM at the image height of 108 mm with respect to various combinations of distances S and P, and various scanning coefficients K (K=105, K=125, K=135.5, and K=180).

In the above description, the reflection type scanning optical system embodying the present invention is used for an image forming apparatus. If the semiconductor laser 1 is replaced with a light receiving device such as a photo detector, the optical system can be used for reading optical system for scanner, facsimile or the like. When the optical system is used for reading optical system, a surface to be read is placed at the object surface 7. The surface to be scanned may be a document having characters, pictures and the like. Further, with this system, the surface to be read may be a surface of a semiconductor wafer or the like. In such a case, the surface accuracy of the object can be examined, and obtained as an image information.

Figure 11:
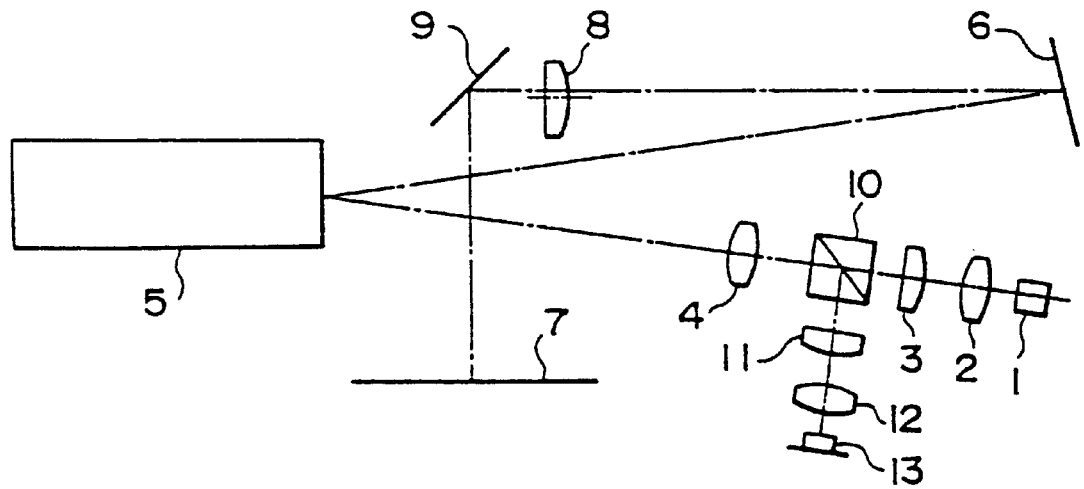
FIG. 11 shows an arrangement of the scanning optical system provided with a reading optical system.

FIG. 11 shows an optical system having both a writing optical system and a reading optical system. The difference between the optical systems shown in FIG. 11 with respect to that in FIG. 1 is that a beam splitter 10 is provided between the cylindrical lens 3 and the condenser lens 4. Further, along the light path of the beam which is split by the beam splitter 10, another cylindrical lens 11, collimator lens 12, and a photo detector 13 are arranged so that the system can be used for either writing or reading.

For reading a color image in accordance with the present invention, it becomes necessary to cancel the chromatic aberration caused by the toric lens 8 in the direction of the auxiliary scanning. When a color image is read with the optical system shown in FIG. 11, scanning of the color image is executed for respective wave lengths corresponding to plural colors, and the cylindrical lens 11 is moved in the direction of the optical axis in accordance with the wave length, or the power of the cylindrical lens 11 is changed in accordance with the wave length, so that an image is focused on the light receiving surface of the photo detector 13 regardless of the wave length.

Figure 12:
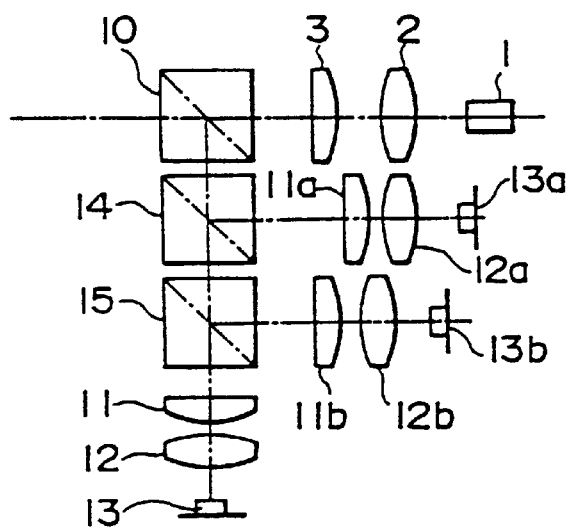
FIG. 12 shows an arrangement of a modified reading optical system.

FIG. 12 shows a modification of the reading optical system of FIG. 11. In this modified optical system, the object surface 7 is illuminated by light which includes a plurality of wavelengths corresponding to the visible light range. The light reflected on the object surface 7 is further reflected by the beam splitter 10, and divided into a plurality of (three) beams of light corresponding to different wavelengths by dichroic prisms 14 and 15. The divided beams are directed to pass through respective cylindrical lenses 11, 11a, and 11b. The divided beams pass through collimator lenses 12, 12a, and 12b, and are focused on respective photo detectors 13, 13a, and 13b. In this modification, the cylindrical lenses 11, 11a, and 11b are positioned at optimum positions for respective wave lengths, and further the magnification of the lenses 11, 11a, and 11b may be set to different optimum values with respect to each other.

Hereinafter, numerical structures of the cylindrical mirror 6 and the toric lens 8 for preferred combinations of the distances S and P, and the scanning coefficient K will be described.

Table 1 indicates a first numerical embodiment of the reflection type scanning optical system. Table 1 indicates the numerical structure of the optical system on the object surface side with respect to the cylindrical mirror 6. In the table, ry represents the radius of curvature in the main scanning plane, rz represents the radius of curvature in the auxiliary scanning plane, d represents the thickness of the lens or distance between lens surfaces, and n780 means the refractive index of the light which has a wavelength of 780 nm. Surface 1 is the surface of the cylindrical mirror and surfaces 2 and 3 are the surfaces of the toric lens 8.

Figure 13A:
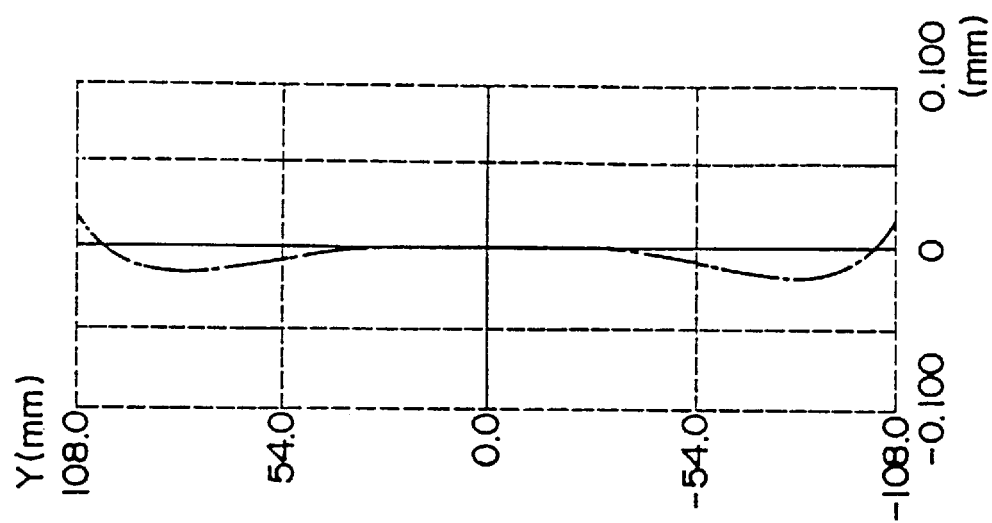
FIG. 13A shows an fθ characteristic according to the first embodiment.
Figure 13B:
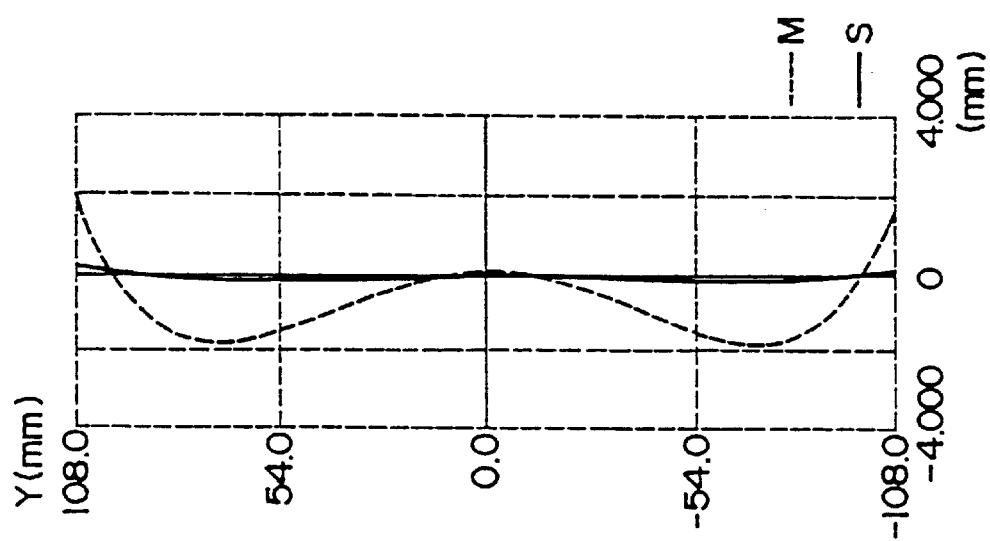
FIG. 13B shows a curvature of the image surface according to the first embodiment.
Figure 13C:
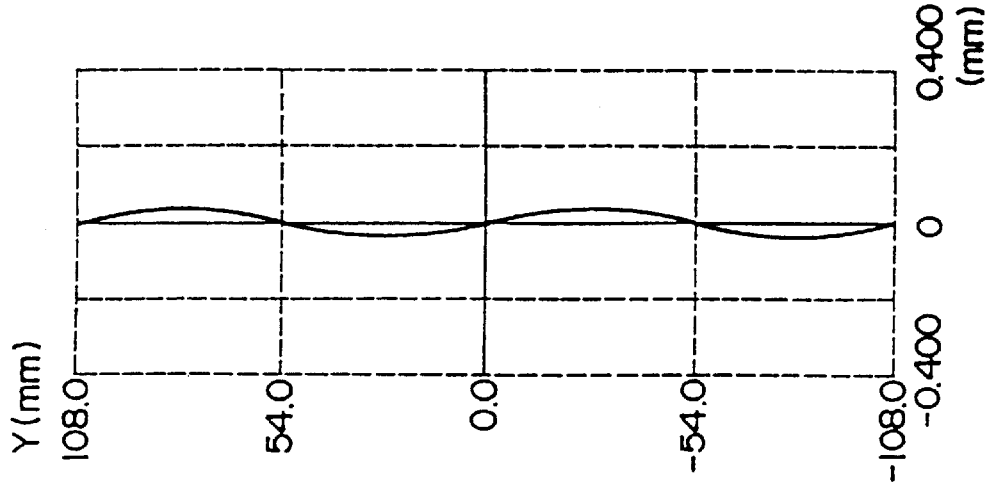
FIG. 13C shows a "bow" characteristic according to the first embodiment.

FIGS. 13A, 13B and 13C show the characteristics of the optical system employing the cylindrical mirror 6 and the toric lens 8 of Table 1. FIG. 13A shows an fθ characteristic. FIG. 13B shows the curvature of the image surface wherein, curve M represents the curvature in the Meridional section and curve S represents the curvature in the Sagittal section. FIG. 13C shows the bow in the direction of the auxiliary scanning. In FIGS. 13A through 13C, the vertical axis represents the height of the image. The horizontal axis of FIG. 13A indicates the displacement of the image height with respect to the ideal image height calculated by Y=K * θ, the horizontal axis of FIG. 13B indicates the displacement of the image plane with respect to the ideal image plane; and the horizontal axis of FIG. 13C indicates the amount of the bow.

TABLE 1

| K = 105 (mm) | S = 181 (mm) | P = 76 (mm) | R = 250.066 (mm) | |
|---|---|---|---|---|
| surface | ry (mm) | rz (mm) | d (mm) | n780 |
| 1 | 250.066 | infinite | 50.000 | |
| 2 | −3000 | −9.800 | 3.000 | 1.48617 |
| 3 | −3000 | | 21.930 | |
| Incident angle to the polygonal mirror | | | 4 degrees | |
| Incident angle to the cylindrical mirror | | | 2.5 degrees | |
| Displacement amount of the toric lens | | | 0.2 mm | |

Table 2 indicates a second numerical embodiment of the reflection type scanning optical system. Table 2 indicates the numerical structure of the optical system on the object surface side with respect to the cylindrical mirror 6. In the table, ry represents the radius of the curvature in the main scanning plane, rz represents the radius of the curvature in the auxiliary scanning plane, d represents the thickness of the lens or distance between lens surfaces, and n780 means the refractive index of the light which has a wavelength of 780 nm. Surface 1 is the surface of the cylindrical mirror, and surfaces 2 and 3 are the surfaces of the toric lens 8.

TABLE 2

| K = 180 (mm) | S = 280 (mm) | P = 140 (mm) | R = 420 (mm) | |
|---|---|---|---|---|
| surface | ry (mm) | rz (mm) | d (mm) | n780 (mm) |
| 1 | 420 | infinite | 66.236 | |
| 2 | −4000 | 21.000 | 5.000 | 1.48617 |
| 3 | −4000 | | 50.300 | |
| Incident angle to the polygonal mirror | | | 4 degrees | |
| Incident angle to the cylindrical mirror | | | 2.6 degrees | |
| Displacement amount of the toric lens | | | 2.0 mm | |

Figure 14C:
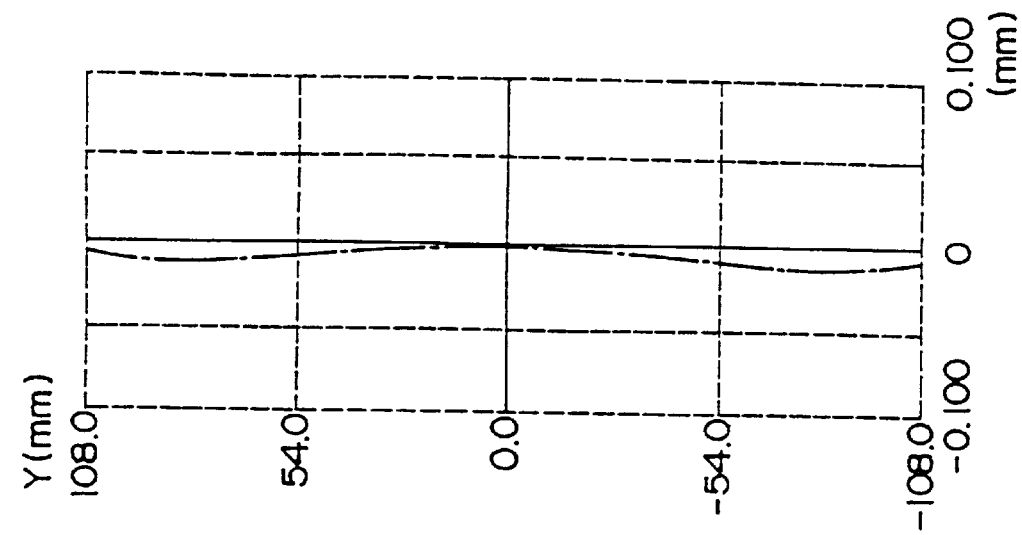
FIG. 14C shows a "bow" characteristic according to the second embodiment.
Figure 14B:
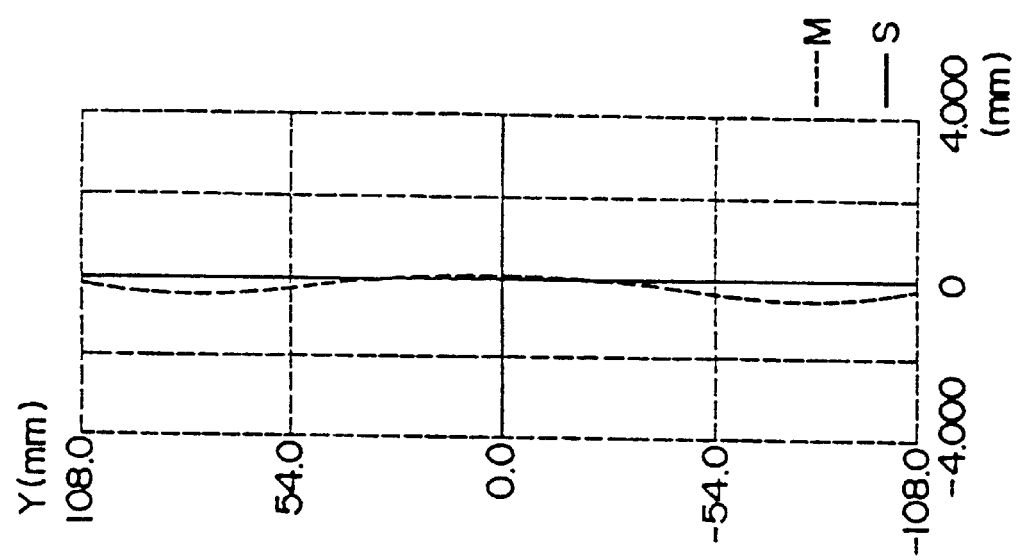
FIG. 14B shows a curvature of the image surface according to the second embodiment.
Figure 14A:
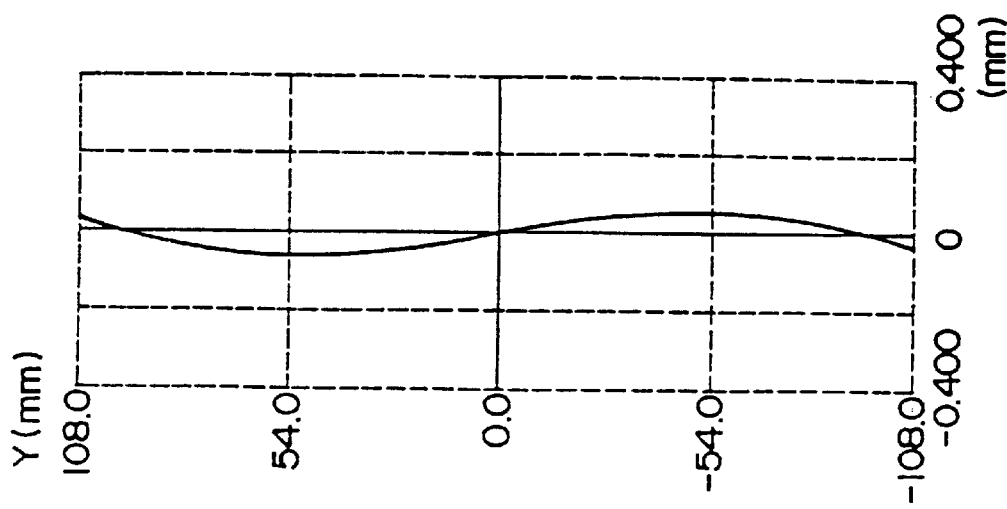
FIG. 14A shows an fθ characteristic according to the second embodiment.

FIGS. 14A, 14B and 14C show the characteristics of the optical system employing the cylindrical mirror 6 and the toric lens 8 of Table 2. FIG. 14A shows an fθ characteristic. FIG. 14B shows the curvature of the image surface wherein curve M represents the curvature along the Meridional section and curve S represents the curvature in the Sagittal section. FIG. 14C shows the bow in the direction of the auxiliary scanning. In FIGS. 14A through 14C, the vertical axis represents the height of the image.

Table 3 indicates a third numerical embodiment of the reflection type scanning optical system. Table 3 indicates the numerical structure of the optical system on the object surface side with respect to the cylindrical mirror 6. FIGS. 15A, 15B and 15C show the characteristics of the optical system employing the cylindrical mirror 6 and the toric lens 8 of Table 3. FIG. 15A shows an fθ characteristic. FIG. 15B shows the curvature of the image surface wherein curve M represents the curvature in the Meridional section and curve S represents the curvature in the Sagittal section. FIG. 15C shows the bow in the direction of the auxiliary scanning.

TABLE 3

| K = 135.5 (mm) | S = 230 (mm) | P = 102 (mm) | R = 317.201 (mm) | |
|---|---|---|---|---|
| surface | ry (mm) | rz (mm) | d (mm) | n780 |
| 1 | 317.201 | infinite | 40.526 | |
| 2 | −2500 | 19.100 | 5.000 | 1.48617 |
| 3 | −2500 | | 50.000 | |
| Incident angle to the polygonal mirror | | | 4 degrees | |
| Incident angle to the cylindrical mirror | | | 2.3 degrees | |
| Displacement amount of the toric lens | | | 1.6 mm | |

Figure 16C:
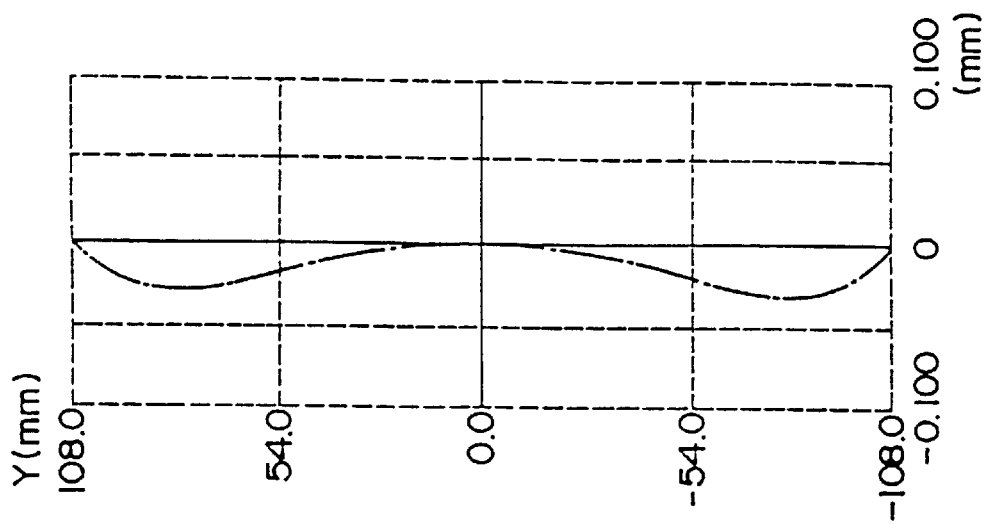
FIG. 16C shows a "bow" characteristic according to the fourth embodiment.
Figure 16B:
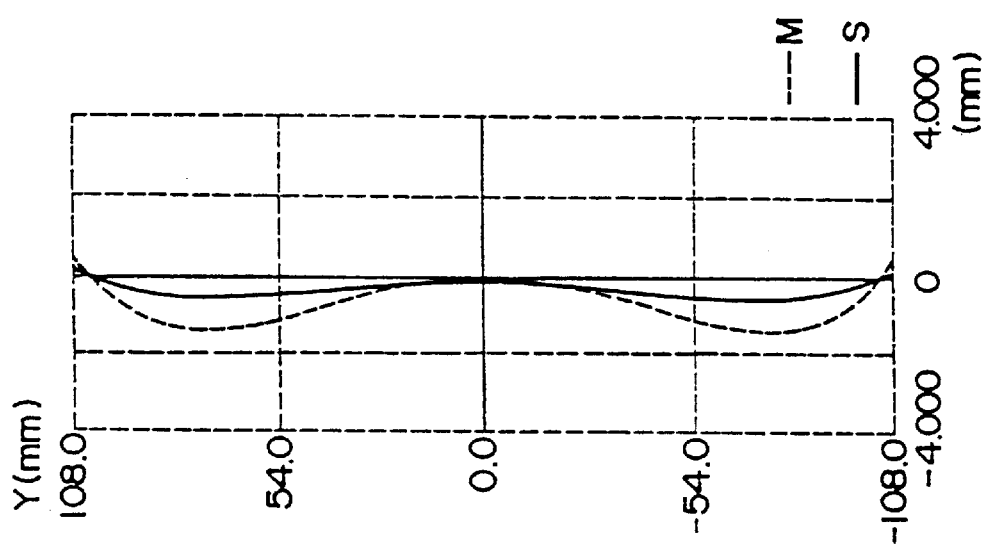
FIG. 16B shows a curvature of the image surface according to the fourth embodiment.
Figure 16A:
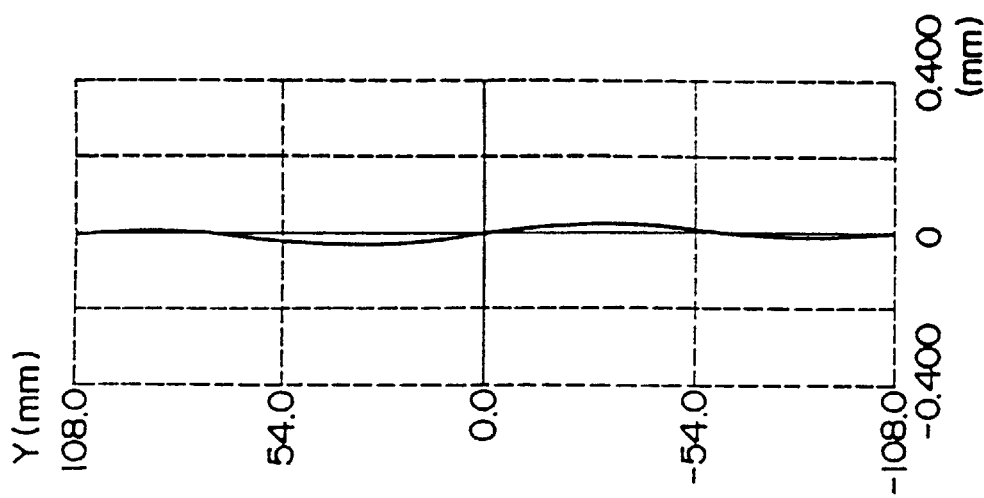
FIG. 16A shows an fθ characteristic according to the fourth embodiment.

Table 4 shows a fourth numerical embodiment of the reflection type scanning optical system. Table 4 indicates the numerical structure of the optical system on the object surface side with respect to the cylindrical mirror 6. FIGS. 16A through 16C show the characteristics of the optical system employing the cylindrical mirror 6 and the toric lens 8 of Table 4. FIG. 16A shows an fθ characteristic. FIG. 16B shows the curvature of the image surface, wherein curve M represents the curvature in the Meridional section and curve S represents the curvature in the Sagittal section: FIG. 16C shows the bow in the direction of the auxiliary scanning.

TABLE 4

| K = 125 (mm) | S = 215 (mm) | P = 93 (mm) | R = 293.716 (mm) |
| --- | --- | --- | --- |

| surface | ry (mm) | rz (mm) | d (mm) | n780 |
| --- | --- | --- | --- | --- |
| 1 | 293.716 | infinite | 33.912 | |
| 2 | −2250 | 18.500 | 5.000 | 1.48617 |
| 3 | −2250 | | 50.000 | |

| | |
| --- | --- |
| Incident angle to the polygonal mirror | 4 degrees |
| Incident angle to the cylindrical mirror | 2.4 degrees |
| Displacement amount of the toric lens | 1.5 mm |

Figure 17A:
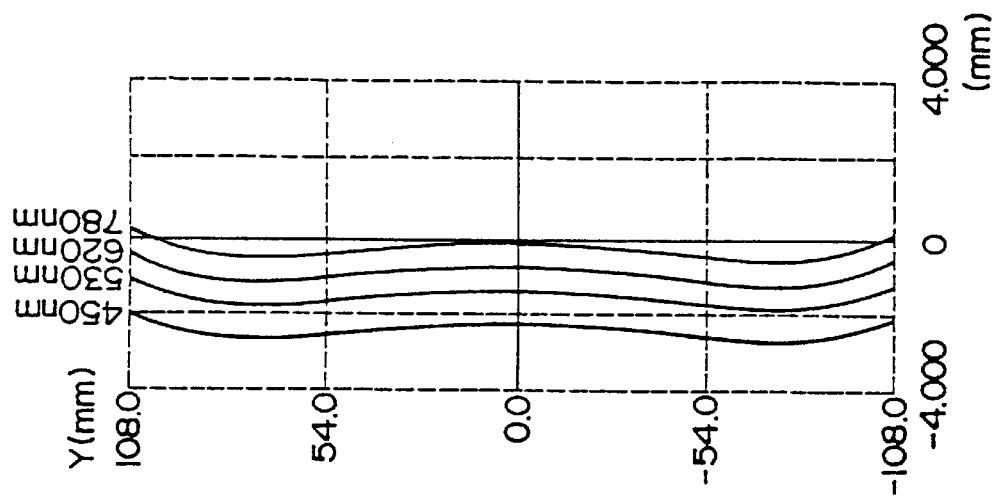
FIG. 17A shows a "bow" characteristic and a chromatic aberration according to the arrangement of the fourth embodiment.
Figure 17B:
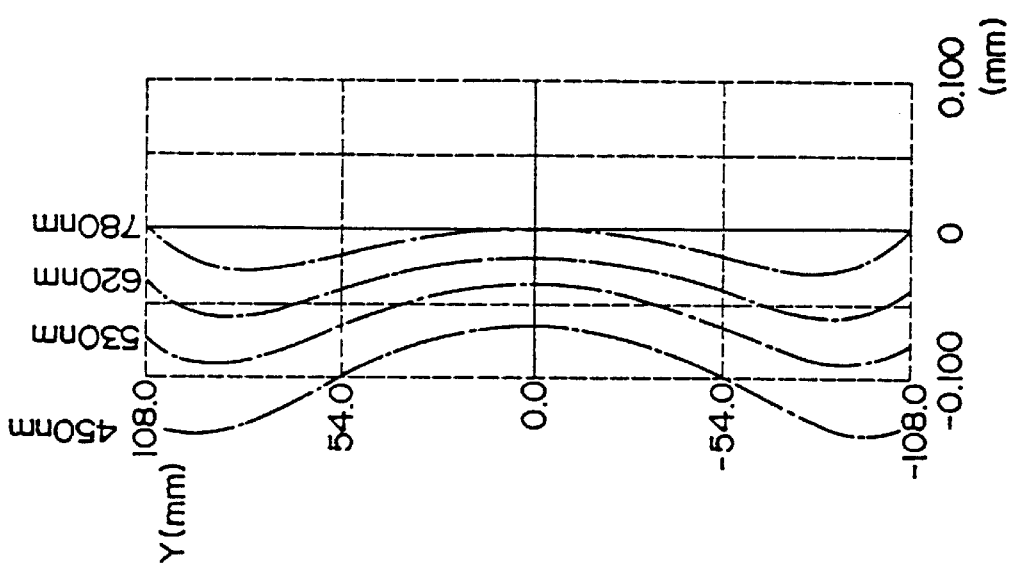
FIG. 17B shows the curvature of the image surface according to the arrangement of the fourth embodiment.

FIGS. 17A and 17B are graphs showing the chromatic aberration in the third numerical embodiment. FIG. 17A shows the bow in the direction of auxiliary scanning and FIG. 17B shows the curvature of the image surface in the direction of the auxiliary scanning. In this optical system, power in the direction of the main scanning is provided by the cylindrical mirror 6, and power in the direction of the auxiliary scanning is provided by the toric lens 8. Consequently, the chromatic aberration occurs only in the direction of the auxiliary scanning. The chromatic aberration shown in FIGS. 17A and 17B can be ignored if the resolution of the reading optical system is 300 dpi (dots per inch) or less. However, if an optical system is required to provide greater resolution value, the chromatic aberration should be compensated.

Shifting of the scanning line for respective wave lengths in the direction of the auxiliary scanning as shown in FIG. 17A can be compensated by shifting the position of the respective photo detectors 13, 13a, and 13b in the direction of the auxiliary scanning in accordance with the wave length to be incident to the respective detectors. Shifting of the curvature of the image surface for the respective wave lengths in the direction of the auxiliary scanning as shown in FIG. 17B can be compensated by shifting the position of the cylindrical lens 11, 11a, and 11b in the direction of the optical axis in accordance with the wave lengths passing therethrough.

Figure 18:
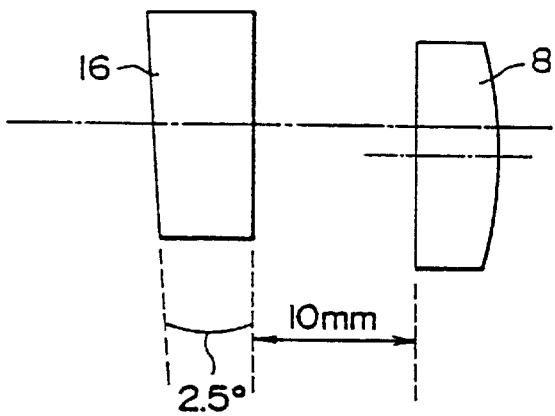
FIG. 18 is a diagram showing the arrangement of a prism and the toric lens according to the fifth embodiment.

Table 5 shows a fifth numerical embodiment of the reflection type scanning optical system. Table 5 indicates the numerical structure for the object surface side of the optical system with respect to the cylindrical mirror 6. In the fifth numerical embodiment, the cylindrical mirror 6 and the toric lens 8 are the same as used in the fourth numerical embodiment. However, as shown in FIG. 18, a prism 16 which has an apex angle of 2.5 degrees, and is 3 mm thick along the optical axis thereof, is inserted between the toric lens 8 and the object surface 7. The distance between the prism 16 and the toric lens 8 is 10 mm. In the fifth numerical embodiment, the incident angle of the laser beam to the cylindrical mirror 6, and the displacement amount of the optical axis of the beam with respect to the optical axis of the toric lens 8 are different from those in the fourth numerical embodiment. The refractive index of the prism 16 for light having the wavelength of 780 nm is 1.76591, and Abbe's number vd is 25.7.

TABLE 5

| K = 125 (mm) | S = 215 (mm) | P = 93 (mm) | R = 293.716 (mm) |
| --- | --- | --- | --- |

| surface | ry (mm) | rz (mm) | d (mm) | n780 |
| --- | --- | --- | --- | --- |
| 1 | 293.716 | infinite | 33.912 | |
| 2 | −2250 | 18.500 | 5.000 | 1.48617 |
| 3 | −2250 | | 51.350 | |

TABLE 5-continued

| | |
| --- | --- |
| Incident angle to the polygonal mirror | 4 degrees |
| Incident angle to the cylindrical mirror | 3 degrees |
| Displacement amount of the toric lens | 2.4 mm |

Figure 19:
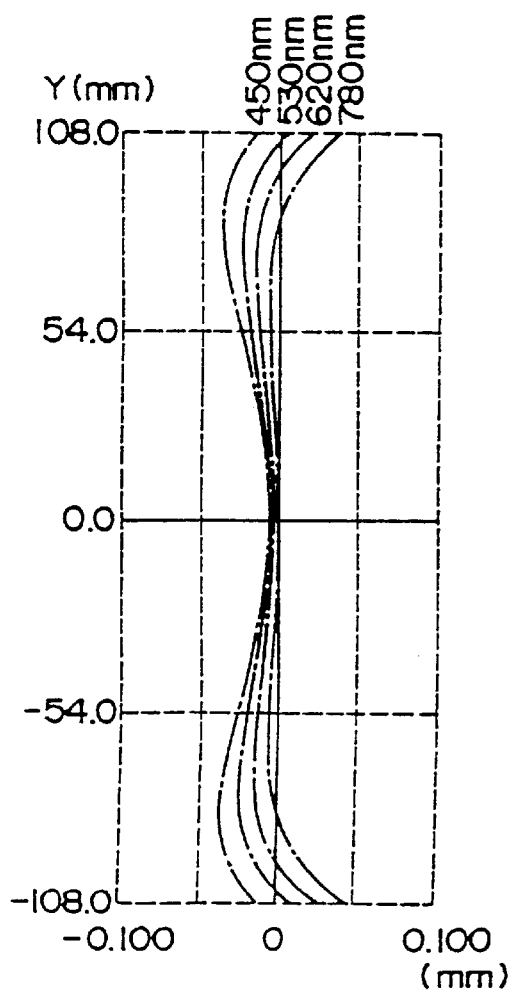
FIG. 19 is a graph showing the "bow" characteristics for different represenative wave lengths in accordance with the fifth embodiment.

FIG. 19 is a graph showing the bow for various wavelengths which occurred in the fifth numerical embodiment. As shown in the graph, although differences of the bow among respective wavelengths still remain, the chromatic aberration is compensated at the central zone of the scanning area. In the fifth numerical embodiment, the prism 16 is an independent optical element to be inserted in the light path. It is possible to form the surface of the cylindrical mirror to have wedge shaped glass which function as if a prism is inserted.

TABLE 6

| K = 125 (mm) | S = 215 (mm) | P = 93 (mm) | R = 293.716 |
| --- | --- | --- | --- |

| surface | ry (mm) | rz (mm) | d (mm) | n780 |
| --- | --- | --- | --- | --- |
| 1 | 293.716 | infinite | 34.412 | |
| 2 | −2250 | 18.500 | 5.000 | 1.48617 |
| 3 | −2250 | | 49.500 | |

| | |
| --- | --- |
| Incident angle to the polygonal mirror | 4 degrees |
| Incident angle to the cylindrical mirror | 4.7 degrees |
| Displacement amount of the toric lens | 2.5 mm |

Figure 20:
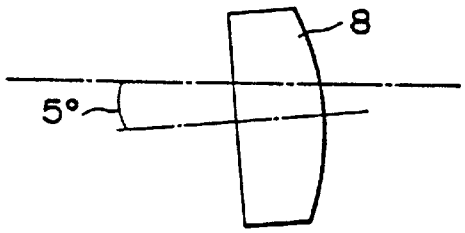
FIG. 20 is a diagram showing the arrangement of the toric lens according to the sixth embodiment.

Table 6 shows a sixth numerical embodiment of the reflection type scanning optical system. Table 6 indicates the numerical structure for the optical system on the object surface side with respect to the cylindrical mirror 6. In the sixth numerical embodiment, as shown in FIG. 20, the optical axis of the toric lens 8 is inclined by 5 degrees with respect to the optical axis of the laser beam.

Figure 21:
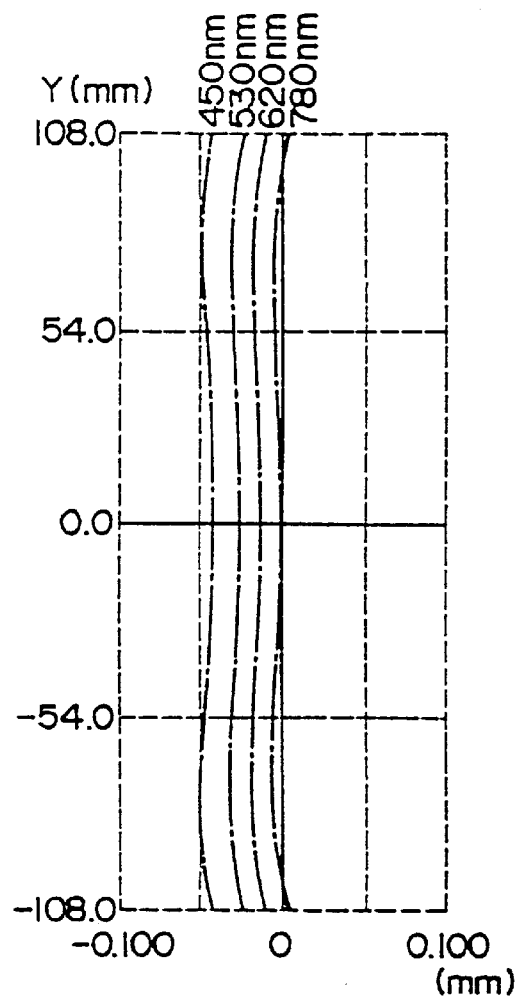
FIG. 21 is a graph showing the "bow" characteristics for different representative wave lengths in accordance with the sixth embodiment.

FIG. 21 is a graph showing the bow in the sixth numerical embodiment. In the sixth numerical embodiment, the magnitude of the bow when the toric lens 8 is tilted (i.e., the sixth numerical embodiment) is about ⅔ of the bow when the toric lens 8 is not tilted (i.e., the fourth numerical embodiment, see FIGS. 17A and 17B). Further, the curvature of the bow for each wavelength is flater than that shown in FIG. 17B.

Figure 22:
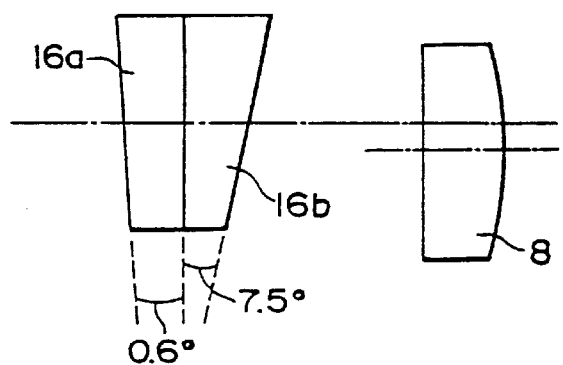
FIG. 22 is a diagram showing the arrangement of prisms and the toric lens according to the seventh embodiment.

Table 7 shows a seventh numerical embodiment of the reflection type scanning optical system. Table 7 indicates the numerical characteristics of the optical system on the object surface side with respect to the cylindrical mirror 6. In the seventh numerical embodiment, as shown in FIG. 22, prisms 16a and 16b are contacted and inserted on the object surface side of the toric lens 8. The distance between the prisms and the toric lens is 6.315 mm. The numerical structure of the prisms 16a and 16b is indicated in Table 8.

TABLE 7

| K = 125 (mm) | S = 215 (mm) | P = 93 (mm) | R = 293.716 |
| --- | --- | --- | --- |

| surface | ry (mm) | rz (mm) | d (mm) | n780 |
| --- | --- | --- | --- | --- |
| 1 | 293.716 | infinite | 33.912 | |
| 2 | −2250 | 18.500 | 5.000 | 1.48617 |
| 3 | −2250 | | 52.315 | |

| | |
| --- | --- |
| Incident angle to the polygonal mirror | 4 degrees |
| Incident angle to the cylindrical mirror | 4.5 degrees |
| Displacement amount of the toric lens | 2.4 mm |

TABLE 8

| apex angle | 0.6 degrees | 7.5 degrees |
|---|---|---|
| n780 | 1.76591 | 1.51072 |
| vd | 64.1 | 25.7 |
| thickness along the optical axis | 3 mm | 3 mm |

Figure 23B:
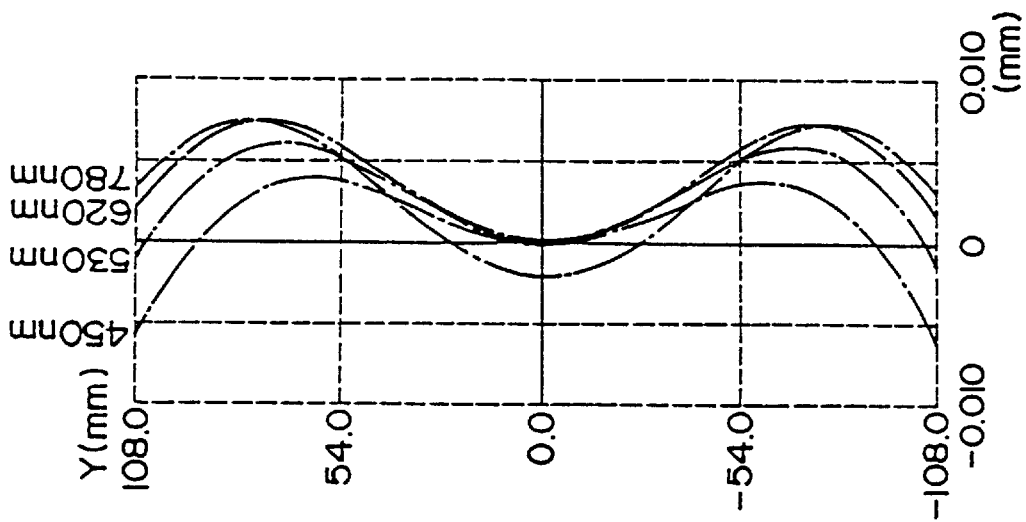
FIG. 23B is a graph similar to FIG. 23A, but the unit of the vertical axis is reduced to 1/10.
Figure 23A:
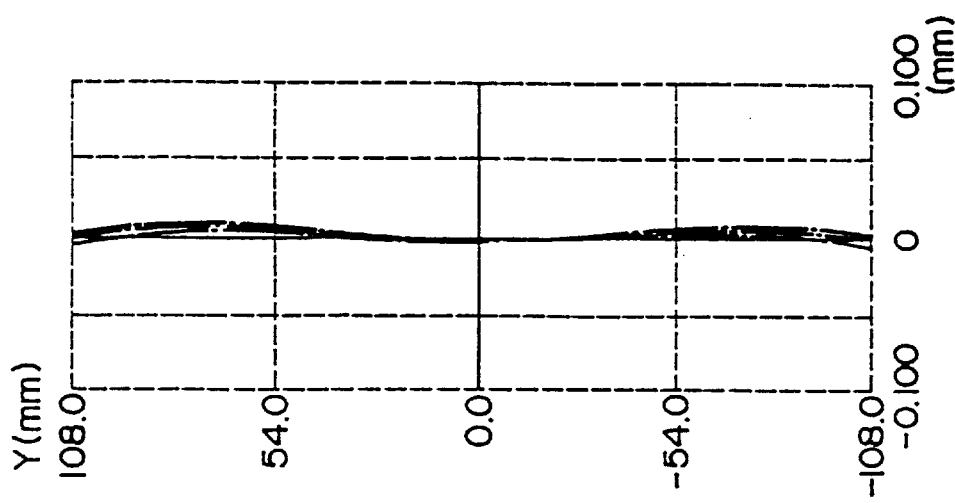
FIG. 23A is a graph showing the "bow" characteristics for different representative wave lengths in accordance with the seventh embodiment.

According to the seventh numerical embodiment, as shown in FIG. 23A, the magnitude of the bow can be supressed (or minimized), and further the differences between the bows for respective wavelengths can be supressed (or minimized). FIG. 23B shows the same bows as in FIG. 23A but the unit of the vertical axis is reduced to $\frac{1}{10}$.

Figure 24:
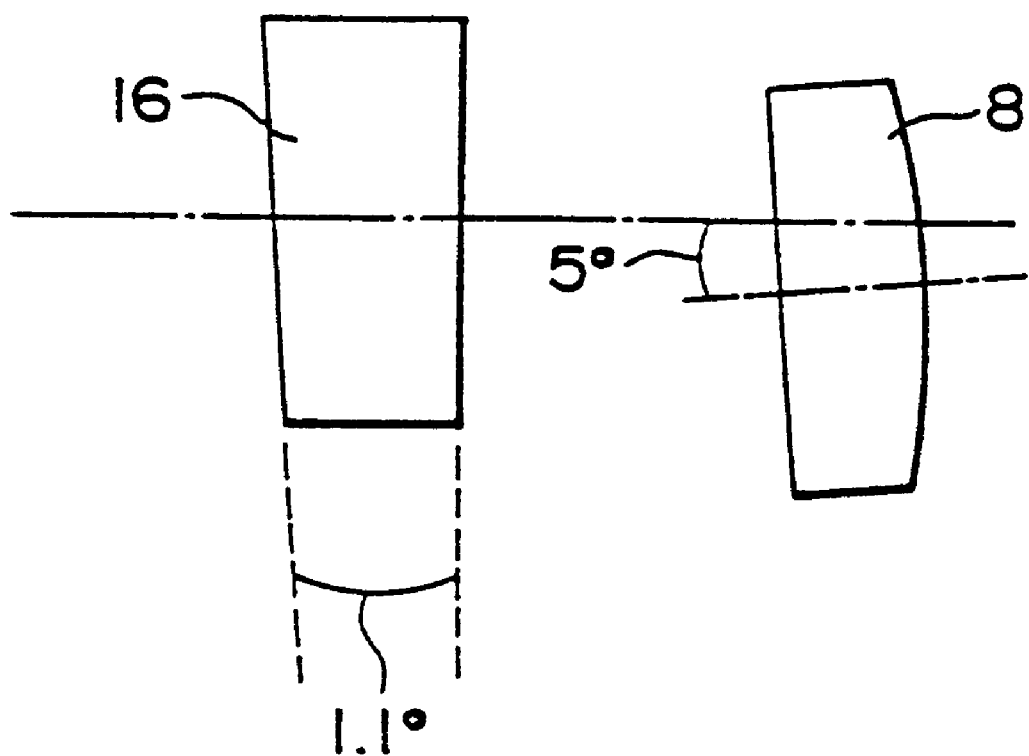
FIG. 24 shows an arrangement of a prism and the toric lens according to the eighth embodiment.

Table 9 shows an eighth numerical embodiment of the reflection type scanning optical system. Table 9 indicates the numerical structure of the optical system on the object side with respect to the cylindrical mirror 6. In the eighth numerical embodiment, as shown in FIG. 24, the optical axis of the toric lens 8 is displaced and inclined by 5 degrees with respect to the optical axis of the laser beam. Further, a prism 16, which has an apex angle of 1.1 degrees and is 3 mm thick along the optical axis thereof, is inserted between the toric lens 8 and the object surface. The distance between the prism 16 and the toric lens 8 is 10 mm. The refractive index of the prism 16 for light having a wavelength of 780 nm is 1.76591, and Abbe's number vd is 25.7.

TABLE 9

| K = 125 (mm) | S = 215 (mm) | P = 93 (mm) | R = 293.716 |
|---|---|---|---|
| surface | ry (mm) | rz (mm) | d (mm) | n780 |
| 1 | 293.716 | infinite | 34.412 | |
| 2 | −2250 | 18.500 | 5.000 | 1.48617 |
| 3 | −2250 | | 50.85 | |

| Incident angle to the polygonal mirror | 4 degrees |
|---|---|
| Incident angle to the cylindrical mirror | 5.1 degrees |
| Displacement amount of the toric lens | 2.5 mm |

Figure 25A:
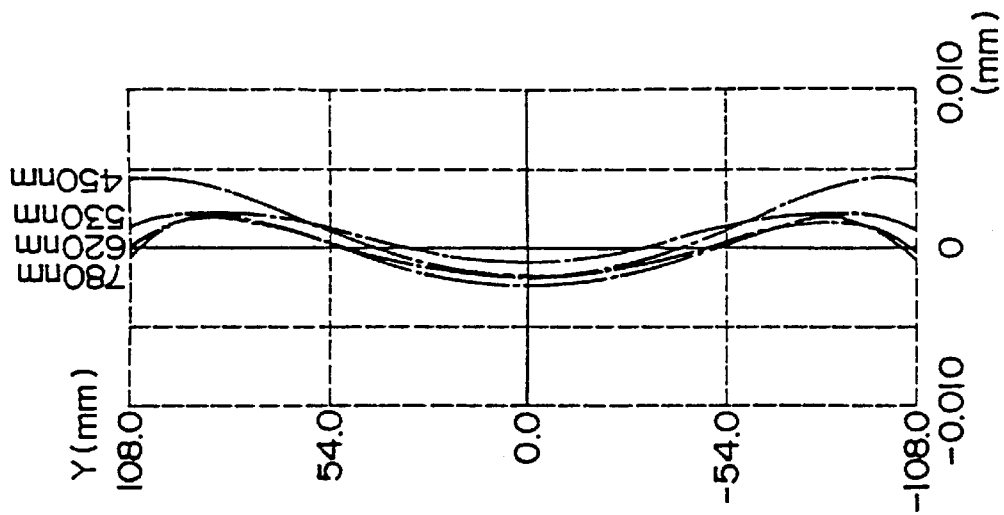
FIG. 25A is a graph showing the "bow" characteristics for different representative wave lengths in accordance with the eighth embodiment.
Figure 25B:
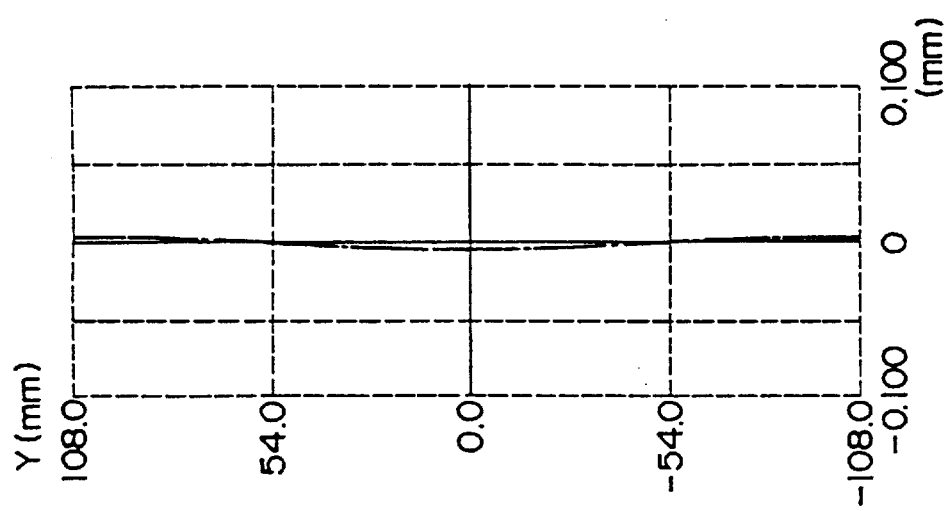
FIG. 25B is a graph similar to FIG. 25A, but the unit of the horizontal axis is reduced to 1/10.

According to the eighth numerical embodiment, as shown in FIGS. 25A and 25B, the magnitude of the bow is supressed, and further the differences among bows for respective wavelengths are also supressed. FIG. 25B shows the same characteristics in FIG. 25A, but the unit of the horizontal axis is reduced to $\frac{1}{10}$.

Figure 26:
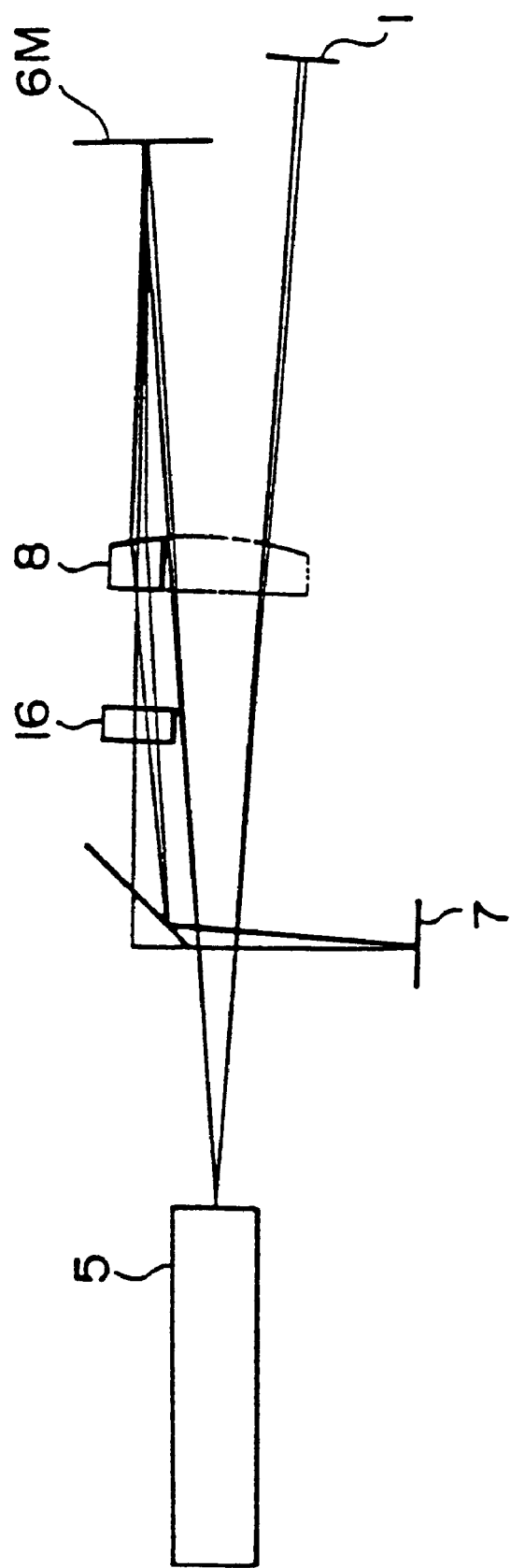
FIG. 26 is a diagram showing the arrangement of the optical elements according to the ninth embodiment.

FIG. 26 shows an arrangement, in the direction of the auxiliary scanning, corresponding to a ninth numerical embodiment of the reflection type scanning optical system. In the first through eighth numerical embodiments, the cylindrical mirror 6 is used as a curved mirror. In the ninth numerical embodiment, instead of the cylindrical mirror, a spherical mirror 6M is used. Even if the spherical mirror is used, the scanning system can be operated substantially similarly to the scanning systems employing the cylindrical mirror. When the spherical mirror is used, since it has power in the direction of the auxiliary scanning, the toric lens is constructed such that the power in the direction of the auxiliary scanning is weaker than in the case where the cylindrical mirror is used.

TABLE 10

| K = 125 (mm) | S = 215 (mm) | P = 93 (mm) | R = 293.716 |
|---|---|---|---|
| surface | ry (mm) | rz (mm) | d (mm) | n780 |
| 1 | −293.716 | −293.716 | 33.912 | |
| 2 | −1500 | −23.500 | 5.000 | 1.48617 |
| 3 | −1500 | | 50.85 | |

TABLE 10-continued

| Incident angle to the polygonal mirror | 4 degrees |
|---|---|
| Incident angle to the cylindrical mirror | 2.25 degrees |
| Displacement amount of the toric lens | 5.5 mm |

Table 10 shows the numerical structure for a ninth numerical embodiment of the reflection type scanning optical system. Table 10 indicates the values for the optical system on the object surface side with respect to the spherical mirror 6M. In the ninth numerical embodiment, as shown in FIG. 26, a prism 16 is inserted on the objective side of the toric lens 8 at the distance of 10 mm. The optical axis of the toric lens 8 is displaced with respect to the optical axis of the laser beam. The prism 16 has an apex angle of 3.5 degrees, and is 3 mm thick along the optical axis thereof. The refractive index of the prism 16 for light having a wavelength of 780 nm is 1.76591, and Abbe's number vd is 25.7.

Figure 27:
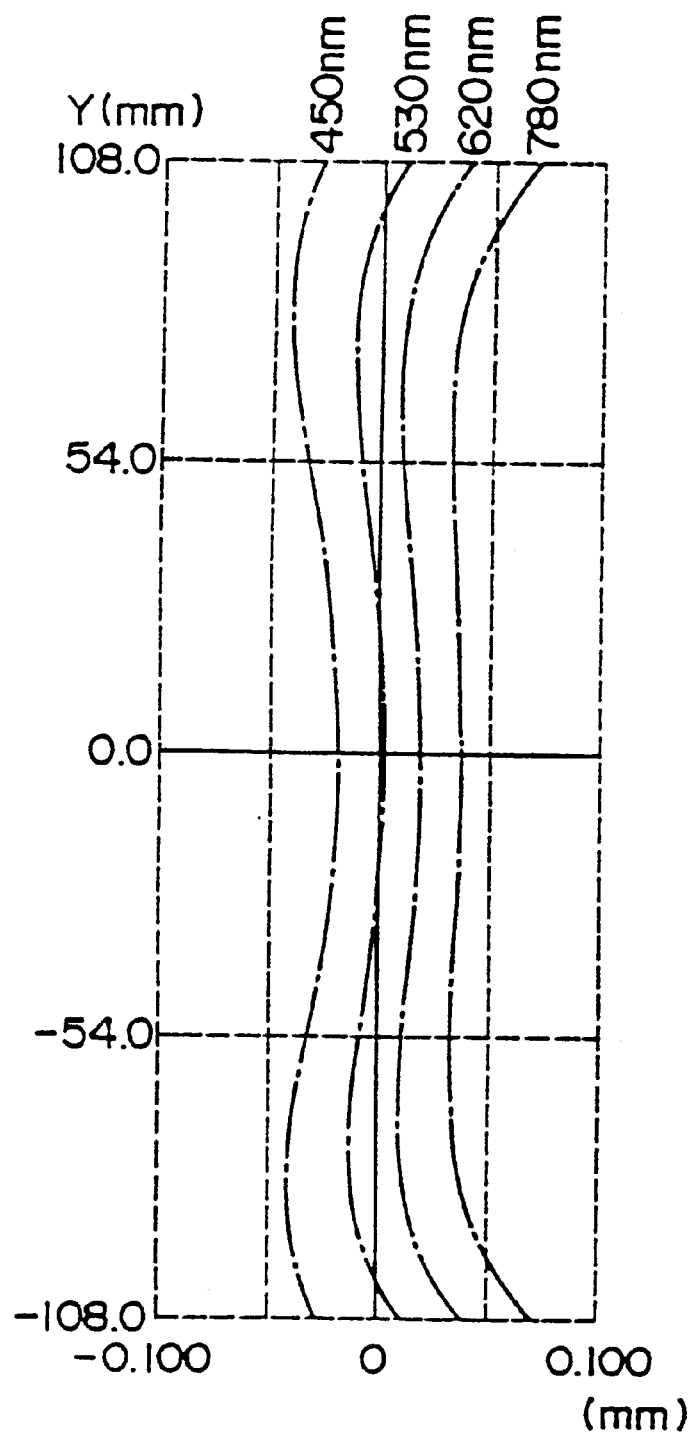
FIG. 27 is a graph showing the "bow" characteristics for the different wave lengths in accordance with the ninth embodiment.

According to the ninth numerical embodiment, as shown in FIG. 27, the magnitude of the bow is supressed, and further the differences among bows for respective wavelengths can also be supressed.

As described above, according to the present invention, since a curved mirror is used instead of an fθ lens, chromatic aberration is not caused by this element.

Further, in the present invention, since the optical axis of the beam incident to the polygonal mirror crosses the rotational axis of the polygonal mirror, a relatively wide scannable range can be obtained. Furthermore, since the curvature of the image surface occurs symmetrically with respect to the center of the image field, compensation for the curvature can be facilitated.

Since the beam incident to the deflection mirror is inclined, a bend of the scanning line, i.e., the bow occurs. The beam incident to the curved mirror is inclined in the direction of the auxiliary scanning, which causes another bow. In this invention, it is possible to arrange the optical elements so that the bow caused by the curved mirror cancels the bow caused by the deflection mirror. Consequently, according to the present invention, reading and forming an image can be executed with high resolution.

The present disclosure relates to subject matters contained in Japanese Patent Application Nos. HEI 5-004957, filed on Jan. 14, 1993, and HEI 5-276974, filed on Nov. 5, 1993 which are expressly incorporated herein by reference in their entireties.

What is claimed is:

1. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror is inclined in a direction of an auxiliary scanning, and a direction of incidence of the beam onto said deflection mirror intersects a rotational axis of said deflection mirror, and the direction of the beam is orthogonal to one of said plurality of light reflection surfaces when viewed in said main scanning plane as the beam reaches the center of said predetermined scanning angle zone;

a curved mirror having power at least in said main scanning plane, the beam reflected by said plurality of light reflection surfaces being incident to said curved mirror and being reflected towards said object surface at a predetermined angle in said auxiliary scanning direction; and a toric lens positioned between said curved mirror and said object surface for converging the beam reflected by said curved mirror onto said object surface, said toric lens having power at least in said auxiliary scanning direction, said toric lens having power substantially only in said auxiliary scanning direction, said power of said toric lens being stronger at a center portion of said toric lens than at peripheral portions of said toric lens in said main scanning direction.

2. The scanning optical system according to claim 1, said light emitting device, said deflection mirror and said curved mirror being arranged so as to minimized bow of a scanning line in said auxiliary direction.

3. The scanning optical system according to claim 1, said curved mirror comprising a cylindrical mirror.

4. The scanning optical system according to claim 1, said light emitting device emitting a laser beam carrying image information, said object surface comprising a photoconductive material forming a latent image upon exposure to said laser beam.

5. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror is inclined in a direction of an auxiliary scannings, and a direction of incidence of the beam onto said deflection mirror intersects a rotational axis of said deflection mirror, and the direction of the beam is orthogonal to one of said plurality of light reflection surfaces when viewed in said main scanning plane as the beam reaches the center of said predetermined scanning angle zone;

a curved mirror having power at least in said main scanning plane, the beam reflected by said plurality of light reflection surfaces being incident to said curved mirror and being reflected towards said object surface at a predetermined angle in said auxiliary scanning direction; and a toric lens positioned between said curved mirror and said object surface for converging the beam reflected by said curved mirror onto said object surface, said toric lens having power at least in said auxiliary scanning direction, said toric lens being arranged such that an optical axis of said toric lens is displaced with respect to an optical axis of said scanning optical system.

6. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror is inclined in a direction of an auxiliary scanning, and a direction of incidence of the beam onto said deflection mirror intersects a rotational axis of said deflection mirror, and the direction of the beam is orthogonal to one of said plurality of light reflection surfaces when viewed in said main scanning plane as the beam reaches the center of said predetermined scanning angle zone;

a curved mirror having power at least in said main scanning plane, the beam reflected by said plurality of light reflection surfaces being incident to said curved mirror and being reflected towards said object surface at a predetermined angle in said auxiliary scanning direction; and a toric lens positioned between said curved mirror and said object surface for converging the beam reflected by said curved mirror onto said object surface, said toric lens having power at least in said auxiliary scanning direction, said toric lens having curvature in a direction opposite to a direction of curvature of said curved mirror.

7. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror is inclined in a direction of an auxiliary scanning, and a direction of incidence of the beam onto said deflection mirror intersects a rotational axis of said deflection mirror, and the direction of the beam is orthogonal to one of said plurality of light reflection surfaces when viewed in said main scanning plane as the beam reaches the center of said predetermined scanning angle zone;

a curved mirror having power at least in said main scanning plane, the beam reflected by said plurality of light reflection surfaces being incident to said curved mirror and being reflected towards said object surface at a predetermined angle in said auxiliary scanning direction;

a toric lens positioned between said curved mirror and said object surface for converging the beam reflected by said curved mirror onto said object surface, said toric lens having power at least in said auxiliary scanning direction; and a light shield member that prevents a beam reflected by a surface of said toric lens from being incident onto said object surface.

8. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone alone a main scanning plane, wherein the beam incident to said deflection mirror, as well as a beam reflected from said deflection mirror, are inclined in an auxiliary scanning direction;

a curved mirror having power at least in said main scanning plane, the beam reflected by said plurality of reflection surfaces being incident to said curved mirror and reflected towards said object surface at a predetermined angle in said auxiliary scanning direction; and a toric lens positioned between said curved mirror and said object surface for converging the beam reflected by said curved mirror onto said object surface, said toric lens having power substantially only in said auxiliary scanning direction, said power of said toric lens being stronger at a center portion of said toric lens than at peripheral portions of said toric lens in said main scanning direction.

9. The scanning optical system according to claim 8, said light emitting device, said deflection mirror and said curved mirror being arranged so as to minimize bow of a scanning line in said auxiliary scanning direction.

10. The scanning optical system according to claim 8, said curved mirror comprising a cylindrical mirror.

11. The scanning optical system according to claim 8, said light emitting device emitting a laser beam carrying image information, said object surface comprising a photoconductive material forming a latent image upon exposure to said laser beam.

12. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror, as well as a beam reflected from said deflection mirror, are inclined in an auxiliary scanning direction;

a curved mirror having power at least in said main scanning plane, the beam reflected by said plurality of reflection surfaces being incident to said curved mirror and reflected towards said object surface at a predetermined angle in said auxiliary scanning direction; and a toric lens positioned between said curved mirror and said object surface for converging the beam reflected by said curved mirror onto said object surface, said toric lens being arranged such that an optical axis of said toric lens is displaced with respect to an optical axis of said scanning optical system.

13. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror, as well as a beam reflected from said deflection mirror, are inclined in an auxiliary scanning direction;

a curved mirror having power at least in said main scanning plane, the beam reflected by said plurality of reflection surfaces being incident to said curved mirror and reflected towards said object surface at a predetermined angle in said auxiliary scanning direction; and a toric lens positioned between said curved mirror and said object surface for converging the beam reflected by said curved mirror onto said object surface, said toric lens having curvature in a direction opposite to a direction of curvature of said curved mirror.

14. A scanning optical system for scanning an object surface, comprising:

a light emitting device for emitting a beam of light;

a deflection mirror having a plurality of light reflection surfaces, said deflection mirror being rotatable to deflect the beam emitted by said light emitting device, and to scan within a predetermined scanning angle zone along a main scanning plane, wherein the beam incident to said deflection mirror, as well as a beam reflected from said deflection mirror, are inclined in an auxiliary scanning direction;

a curved mirror having power at least in said main scanning plane, the beam reflected by said plurality of reflection surfaces being incident to said curved mirror and reflected towards said object surface at a predetermined angle in said auxiliary scanning direction;

a toric lens positioned between said curved mirror and said object surface for converging the beam reflected by said curved mirror onto said object surface; and a light shield member that prevents a beam reflected by a surface of said toric lens from being incident onto said object surface.

* * * * *